(12) United States Patent
Israel et al.

(10) Patent No.: US 10,275,422 B2
(45) Date of Patent: Apr. 30, 2019

(54) SYSTEMS AND METHODS FOR FINDING QUANTUM BINARY OPTIMIZATION PROBLEMS

(71) Applicant: D-Wave Systems Inc., Burnaby (CA)

(72) Inventors: Robert Israel, Richmond (CA); William G. Macready, West Vancouver (CA); Zhengbing Bian, Burnaby (CA); Fabian Chudak, Vancouver (CA); Mani Ranjbar, Burnaby (CA)

(73) Assignee: D-WAVE SYSTEMS, INC., Burnaby (CA)

( * ) Notice: Subject to any disclaimer, the term of this patent is extended or adjusted under 35 U.S.C. 154(b) by 1069 days.

(21) Appl. No.: 14/671,862

(22) Filed: Mar. 27, 2015

(65) Prior Publication Data

US 2015/0205759 A1    Jul. 23, 2015

Related U.S. Application Data

(63) Continuation-in-part of application No. 14/540,944, filed on Nov. 13, 2014, now abandoned.

(60) Provisional application No. 61/906,220, filed on Nov. 19, 2013, provisional application No. 61/977,458, filed on Apr. 9, 2014.

(51) Int. Cl.
*G06F 17/11* (2006.01)
*G06N 99/00* (2019.01)

(52) U.S. Cl.
CPC ........... *G06F 17/11* (2013.01); *G06N 99/002* (2013.01)

(58) Field of Classification Search
CPC .............................. G06F 17/11; G06N 99/002
USPC .............................................................. 703/2
See application file for complete search history.

(56) References Cited

U.S. PATENT DOCUMENTS

| | | |
|---|---|---|
| 6,922,713 B2 | 7/2005 | Walster et al. |
| 7,843,209 B2 | 11/2010 | Berkley |
| 7,876,248 B2 | 1/2011 | Berkley et al. |
| 8,018,244 B2 | 9/2011 | Berkley |
| 8,035,540 B2 | 10/2011 | Berkley et al. |
| 8,098,179 B2 | 1/2012 | Bunyk et al. |
| 8,169,231 B2 | 5/2012 | Berkley |

(Continued)

FOREIGN PATENT DOCUMENTS

| | | |
|---|---|---|
| WO | 2012/064974 A2 | 5/2012 |
| WO | 2015/060915 A2 | 4/2015 |

OTHER PUBLICATIONS

Bean et al. "The Ising model: teaching an old problem new tricks", D-Wave Systems. Aug. 30, 2010. 32 Pages.*

(Continued)

*Primary Examiner* — Eunhee Kim
(74) *Attorney, Agent, or Firm* — Cozen O'Connor

(57) ABSTRACT

Methods and systems represent constraint as an Ising model penalty function and a penalty gap associated therewith, the penalty gap separating a set of feasible solutions to the constraint from a set of infeasible solutions to the constraint; and determines the Ising model penalty function subject to the bounds on the programmable parameters imposed by the hardware limitations of the second processor, where the penalty gap exceeds a predetermined threshold greater than zero. Such may be employed to find quantum binary optimization problems and associated gap values employing a variety of techniques.

19 Claims, 20 Drawing Sheets

(56) References Cited

U.S. PATENT DOCUMENTS

| | | | |
|---|---|---|---|
| 8,190,548 | B2 | 5/2012 | Choi |
| 8,655,828 | B2 | 2/2014 | Rose |
| 8,700,689 | B2 | 4/2014 | Macready et al. |
| 2008/0065573 | A1* | 3/2008 | Macready ............ G06N 7/08 706/19 |
| 2012/0094838 | A1 | 4/2012 | Bunyk et al. |
| 2014/0025606 | A1 | 1/2014 | Macready |
| 2014/0187427 | A1 | 7/2014 | Macready et al. |

OTHER PUBLICATIONS

Bian et al., "Discrete optimization using quantum annealing on sparse Ising models," *Frontiers in Physics* 2(56):1-10, Sep. 2014.
Bocko et al., "Prospects for Quantum Coherent Computation Using Superconducting Electronics," *IEEE Transactions on Applied Superconductivity* 7(2):3638-3641, Jun. 1997.
Clarke et al., "Superconducting quantum bits," *Nature* 453:1031-1042, Jun. 19, 2008.
Devoret et al., "Superconducting Circuits for Quantum Information: An Outlook," *Science* 339:1169-1174, Mar. 8, 2013.
Devoret et al., "Superconducting Qubits: A Short Review," arXiv:cond-mat/0411174v1, Nov. 7, 2004, 41 pages.
Friedman et al., "Quantum superposition of distinct macroscopic states," *Nature* 406:43-46, Jul. 6, 2000.
Harris et al., "Experimental Demonstration of a Robust and Scalable Flux Qubit," arXiv:0909.4321v1, Sep. 24, 2009, 20 pages.
Israel, "Systems and Methods of Finding Quantum Binary Optimization Problems," U.S. Appl. No. 14/540,944, filed Nov. 13, 2014, 38 pages.
Israel, "Systems and Methods of Finding Quantum Binary Optimization Problems," U.S. Appl. No. 61/906,220, filed Nov. 19, 2013, 34 pages.
Macready et al., "Systems and Methods of Modeling Boolean Functions and Relations With Quadratic Unconstrained Binary Optimization (QUBO) Problems," U.S. Appl. No. 61/977,458, filed Apr. 9, 2014, 67 pages.
Makhlin et al., "Quantum-state engineering with Josephson-junction devices," *Reviews of Modern Physics* 73(2):357-400, Apr. 2001.
Martinis, "Superconducting phase qubits," *Quantum Inf Process* 8:81-103, 2009.
Mooij et al., "Josephson Persistent-Current Qubit," *Science* 285:1036-1039, Aug. 13, 1999.
Orlando et al., "Superconducting persistent-current qubit," *Physical Review B* 60(22):15398-15413, Dec. 1, 1999.
Zagoskin et al., "Superconducting Qubits," *La Physique au Canada* 63(4):215-227, 2007.

* cited by examiner

Initialize Probe with one-element S
Let *LowerBound* = 0
do
    for each $X \in R \setminus S$ and each $Z \in H$
        Solve $P([S, X], [Z^*, Z])$, obtaining gap $g([S, X], [Z^*, Z])$
    Choose X for which the fewest $g([S, X], [Z^*, Z]) >$ *LowerBound*
    if all $g([S, X], [Z^*, Z]) \leq$ *LowerBound*
        Choose a random k from 1 to |S| - 1
        let $S$ = the first k elements of $S$, $Z^*$ = the first k elements of $Z^*$
        if $k > 1$
            Replace $Z^*_k$ with a different Z
            (with probabilities proportional to $g([S, Z^*_{1..k-1}, Z])$ - *LowerBound*)
        if none of those probabilities > 0, decrement k and try again
    else
        Choose Z with probabilities proportional to $g([S, X], [Z^*, Z])$ - *LowerBound*
        Let $S = [S, X], Z^* = [Z^*, Z]$
    for each $X \in R \setminus S$
        Let $Y(X)$ - argmin$_{Y \in H}$$E(X, Y)|Q$) where $Q$ is the Qubo in the solution of $P(S, Z^*)$
    Solve $P(R, [Z^*, Y])$, obtaining new lower bound $g(R, [Z^*, Y])$
    *LowerBound* = max($g(R, [Z^*, Y])$, *LowerBound*)
    if $g(R, [Z^*, Y]) > 0$ and Tabu Search is not yet running
        start Tabu Search with $[Z^*, Y]$
    else if $g(R, [Z^*, Y]) >$ current value of Tabu Search
        and $[Z^*, Y]$ has not been seen before
        restart Tabu Search with $[Z^*, Y]$
    if Tabu Search is running
        Do one round of Tabu Search, possibly obtaining an improved *LowerBound*
until target is reached or time expires

$x_i \in \{0,1\} | \prod_{i=1}^{3}(-1)^{x_i} = 1$ 1002

$\begin{bmatrix} 0 & 0 & 0 \\ 0 & 1 & 1 \\ 1 & 0 & 1 \\ 1 & 1 & 0 \end{bmatrix}$ $\begin{bmatrix} 1 & 1 & 1 \\ 1 & 0 & 0 \\ 0 & 1 & 0 \\ 0 & 0 & 1 \end{bmatrix}$ $R$ 1004   $R^C$ 1006

1050

$x_i \in \{0,1\} | \vee_{i=1}^{3} x_i = 1$ 1052

$\begin{bmatrix} 0 & 0 & 1 \\ 0 & 1 & 0 \\ 0 & 1 & 1 \\ 1 & 0 & 0 \\ 1 & 0 & 1 \\ 1 & 1 & 0 \\ 1 & 1 & 1 \end{bmatrix}$ $\begin{bmatrix} 0 & 0 & 0 \end{bmatrix}$ $R$ 1054   $R^C$ 1056

FIG. 10

SYSTEMS AND METHODS FOR FINDING QUANTUM BINARY OPTIMIZATION PROBLEMS

FIELD

The present techniques generally relate to finding quantum binary optimization problems, and, more specifically, to systems and methods for solving discrete optimization problems using quantum annealing.

BACKGROUND

Optimization Problems

The object of an optimization problem is finding the best solution amongst a set of possible solutions. Optimization problems are in contrast to decision problems, where the object is to arrive at a yes or no answer.

Constraint Satisfaction Problems

Constraint satisfaction problems (CSPs) are problems defined as a set of objects whose state must satisfy a number of constraints. The constraints are expressed over variables. A solver for a CSP solves the CSP by finding the configuration of variables that satisfies the constraints. Constraint satisfaction problems may be solved using combinatorial searches, heuristics, combinations of these, and the like.

Quadratic Unconstrained Binary Optimization Problems

A quadratic unconstrained binary optimization (QUBO) problem is a form of discrete optimization problem that involves finding a set of N binary variables $\{x_i\}$ that minimizes an objective function of the form:

$$E(x_1, \ldots, x_N) = \sum_{i \leq j}^{N} Q_{ij} x_i y_j$$

where Q is typically a real-valued upper triangular matrix that is characteristic of the particular problem instance being studied. QUBO problems and applications arise in many different fields, for example machine learning, pattern matching, and statistical mechanics, to name a few.

Linear Programming

Linear programming is a method for finding a solution to a combined problem of optimization and solving systems of linear equations. Linear programming is a method for the optimization of a linear objective function subject to linear constraints expressed as equalities and inequalities. The optimal value can be a minimum or a maximum. This can have the form:

Optimize $cx$, subject to $Ax=b$ and subject to $x \geq 0$ where c and b are vectors of coefficients, A is a matrix defining the linear system of equalities, and x is the vector of variables to be determined. The product cx is the objective function to be minimized or maximized. The form of the statement above can be expressed as a series of equalities and inequalities. Linear programming can be used with many problem types including: planning, routing, scheduling, assignment, and portfolio optimization.

Satisfiability Problems

Satisfiability problems (SAT) are a set of decision problems for determining if there a set of values that satisfy a Boolean formula. SAT can determine whether the set of values for a set of variables, called a truth assignment, causes the Boolean formula to evaluate to true. The Boolean formula is made from a series of literals: a Boolean variable or its negation. These literals are then joined into clauses and then joined into the Boolean formula using operators. The form of the clauses and the operator which are used define the subclass of the problems. For example, if there are three literals in the clauses, then the problem is in 3SAT. If the literals are joined by OR operators and the clauses by AND operators the problem is CNF-3SAT. SAT was the first known NP-complete problem. Satisfiability problems arise in industrial applications, computational problems, and the like.

Quantum Annealing

Quantum annealing is a heuristic optimization approach applicable to certain discrete optimization problems. For example, quantum annealing can be used to find a low-energy state of a system, such as the ground state of the system.

Similar in concept to classical annealing, the method relies on the underlying principle that natural systems tend toward lower energy states because lower energy states are more stable. Whereas classical annealing can use classical thermal fluctuations to guide a system to its global energy minimum, quantum annealing can use natural quantum fluctuations, such as quantum tunneling, to reach a global energy minimum more accurately and/or more quickly.

Since the solution to a hard problem, such as a combinatorial optimization problem, can be encoded in the ground state of a system, quantum annealing can be used to find the solution to such hard problems.

Equivalence of QUBO to Ising Model

Quantum hardware can be used to minimize the dimensionless energy of an Ising model mathematically equivalent to the QUBO described above:

$$E(s \mid h, J) = \sum_{i \in V(G)} h_i s_i + \sum_{(i,j) \in E(G)} J_{i,j} s_i s_j$$

where spin variables $s_i \in \{-1, 1\}$ are indexed by the vertices V(G) of a graph G corresponding to a hardware device allowing pairwise interactions given by the edges E(G) of the graph G. The coefficients (also known as the programmable parameters) $h_i$ and $J_{i,j}$ are dimensionless and real-valued.

A quantum annealing process can minimize the Ising energy by evolving the ground state of an initial Hamiltonian to the ground state of a problem Hamiltonian. The ground state of the initial Hamiltonian is a superposition state in which all spin configurations are equally likely. After annealing, the spin configurations with the smallest energy with respect to the problem Hamiltonian are the most likely to be measured.

The efficiency of quantum annealing depends at least in part on the energy gap separating ground and excited states during evolution. Different representations of an optimization problem can have different quantum gaps.

Practical Implementation of Quantum Annealing

The techniques described in the present application relate to problem representations ameliorating limitations imposed by current hardware.

Physical devices can impose limitations on the precision to which the system can specify the programmable coefficients h,J of the Ising model described above. Moreover, the Ising model is only an approximation to the underlying physics, and there can be systematic errors causing a discrepancy between the programmable coefficients and the effective Ising approximation. Consequently, it can be desirable to seek problem representations that are less sensitive to control errors.

Technological limitations can restrict the range of energy scales of programmable coefficients h,J relative to the thermal energy $k_B T$. For problems having few ground states and exponentially many excited states within $k_B T$, where $k_B$ is the Boltzmann constant and T is the temperature. A limited range of energy scales of programmable coefficients h,J can make quantum annealing challenging.

It can be difficult to realize all pairwise couplings in a hardware device, since the number of potential couplings grows as the square of the number of qubits in the system. As a result, quantum annealing hardware capable of accommodating a large number of variables can offer only sparse connectivity. Discrete optimization problems of practical interest can require greater connectivity.

Quantum annealing through minimizing the Ising energy can be challenging for a large number of variables, and real-world problems typically can need a very large number of variables. Moreover, translating a discrete optimization problem into a sparse Ising model can require the addition of ancillary (or helper) variables, thereby increasing the size of the problem even further.

BRIEF SUMMARY

The techniques described in the present application can address the limitations in precision and range of energy scales by finding problem representations in which there is a large classical gap between Ising ground and excited states. In general, a larger gap increases the likelihood that the quantum annealing hardware will find a solution, and offers better protection against noise and limitations in precision.

The techniques described in the present application can address the challenge of sparse connectivity by introducing additional variables to mediate arbitrary connectivity, either by facilitating long-range interactions or by acting as ancillary (or helper) variables.

The techniques described in the present application can mitigate the challenge of needing a very large number of variables by including methods by which large problems (problems with a large number of variables) can be solved through decomposition into a number of smaller sub-problems.

The example implementations described below relate to solving Constraint Satisfaction Problems (CSPs) involving a finite set of binary variables. The systems and methods described herein can relate in other implementations to solving other discrete optimization problems.

Methods and systems to find quantum binary optimization problems and associated gap values employ a variety of techniques.

A method of increasing computational efficiency of a quantum processor based computational system may be summarized as including receiving a relation and a graph; initializing a probe set; initializing a lower bound; for a number of cycles until an end condition is reached: iterating over an expansion of the probe set and a configuration of helper variables to solve a first linear program for a quadratic unconstrained binary optimization (QUBO) problem and an energy gap which corresponds to the QUBO problem; selecting an expanded probe set with a sufficiently small number of solutions for which the energy gap exceeds the lower bound; determining whether there are no solutions for which the energy gap exceeds the lower bound, in response to determining that there are no solutions for which the energy gap exceeds the lower bound, backtracking in the probe set; selecting a respective configuration of helper variables at random based on a probability proportional to a difference between the energy gap and the lower bound; solving a second linear program to determine a first new lower bound; in response to the first new lower bound exceeding the lower bound, setting the lower bound equal to the first new lower bound; performing a local search to determine a second new lower bound; and in response to the second new lower bound exceeding the lower bound, setting the lower bound equal to the second new lower bound.

The method may further include repeating the iterating, selecting, determining, backtracking, selecting, solving, setting and performing until the earliest of: the lower bound exceeds a determined threshold, a defined time has elapsed, or a defined number of cycles has been performed.

A system to increase computational efficiency of a quantum processor based computational system may be summarized as including at least one processor; and at least one nontransitory processor-readable medium communicatively coupled to the at least one processor and which stores at least one of processor-executable instructions or data, which when executed by the at least one processor causes the at least one processor to: initialize a probe set; initialize a lower bound; for a number of cycles until an end condition is reached: iterate over an expansion of the probe set and a configuration of helper variables to solve a first linear program for a quadratic unconstrained binary optimization (QUBO) problem and an energy gap which corresponds to the QUBO problem; select an expanded probe set with a sufficiently small number of solutions for which the energy gap exceeds the lower bound; determine whether there are no solutions for which the energy gap exceeds the lower bound, in response to a determination that there are no solutions for which the energy gap exceeds the lower bound, backtrack in the probe set; select a respective configuration of helper variables at random based on a probability proportional to a difference between the energy gap and the lower bound; solve a second linear program to determine a first new lower bound; in response to the first new lower bound exceeding the lower bound, set the lower bound equal to the first new lower bound; perform a local search to determine a second new lower bound; and in response to the second new lower bound exceeding the lower bound, set the lower bound equal to the second new lower bound. The at least one processor may repeat the cycles until the earliest of: the lower bound exceeds a determined threshold, a defined time has elapsed, or a defined number of cycles has been performed.

A method of increasing computational efficiency of a quantum processor based computational system may be summarized as described and shown in the specification and drawings.

A system to increase computational efficiency of a quantum processor based computational system may be summarized as described and shown in the specification and drawings.

A method of operation in a problem solving system which includes at least a first processor and at least one nontransitory processor-readable medium communicatively coupled to the first processor and which stores at least one of processor-executable instructions or data, wherein one of a number of hardware limitations of a second processor imposes a number of bounds on a set of programmable parameters may be summarized as including, by the first processor, a problem to be solved; representing, by the first processor, the problem to be solved as an Ising model, the Ising model having a number of constraints associated therewith; and for each of the constraints associated the Ising model, determining, by the first processor, a respective Ising model penalty function subject to the bounds on the programmable parameters imposed by the hardware limitations of the second processor, where the respective Ising model penalty function for each constraint has a penalty gap associated therewith that exceeds a predetermined threshold greater than zero.

Determining a respective Ising model penalty function subject to the bounds on the programmable parameters imposed by the hardware limitations of the second processor may include determining the respective Ising model penalty function subject to the bounds on the programmable parameters imposed by the hardware limitations of the second processor in which the penalty gap associated therewith is maximal. The second processor may be a quantum processor and determining a respective Ising model penalty function subject to the bounds on the programmable parameters imposed by the hardware limitations of the second processor, may include determining the respective Ising model penalty function subject to the bounds on the programmable parameters imposed by the hardware limitations of the quantum processor. Determining a respective Ising model penalty function subject to the bounds on the programmable parameters imposed by the hardware limitations of the quantum processor, may include determining the respective Ising model penalty function having the form:

$$\min_a Pen_{F_j}(s, a) \begin{cases} = 0 & \text{if } s \in F_j \\ \geq g & \text{if } s \notin F_j \end{cases}$$

where g>0 and is known the penalty gap of the penalty function, a set of variables s are decision variables upon which the constraint $F_j$ depends, and a set of variables a are ancillary variables. The method may further include: assigning each decision variable and each ancillary variable to a respective one of a plurality of qubits in the quantum processor. Receiving a problem to be solved may include receiving a relation and a graph. Determining a respective Ising model penalty function subject to the bounds on the programmable parameters imposed by the hardware limitations of the second processor, may include iteratively determining the respective Ising model penalty function subject to the bounds on the programmable parameters imposed by the hardware limitations of the second processor to maximize the respective penalty gap of the respective Ising model penalty function. Iteratively determining the respective Ising model penalty function subject to the bounds on the programmable parameters imposed by the hardware limitations of the second processor to maximize the respective penalty gap of the respective Ising model penalty function may include: initializing a probe set, by the first processor, the probe set representing a subset of the relation, and associated with a linear programming problem that constitutes a relaxation of a linear programming problem associated with the problem to be solved; initializing a lower bound, by the first processor; for a number of cycles until an end condition is reached: iterating over an expansion of the probe set and a configuration of ancillary variables to solve a first linear program to find a number of coefficients of the Ising model penalty function and the penalty gap which corresponds to the Ising model penalty function, by the first processor; selecting an expanded probe set with less than a defined total number of solutions for which the penalty gap exceeds the lower bound, by the first processor; determining whether for an expanded probe set there are no solutions for which the penalty gap exceeds the lower bound, by the first processor; in response to determining that there are no solutions for which the penalty gap exceeds the lower bound, backtracking in the probe set, by the first processor; selecting a respective configuration of ancillary variables; solving a second linear program to determine a first new lower bound for the problem, by the first processor, the second linear program associated with all members of the relation and the selected configuration of ancillary variables; in response to the first new lower bound exceeding the lower bound, setting the lower bound equal to the first new lower bound, by the first processor; performing a local search over all members of the relation and the configuration of ancillary variables to determine a second new lower bound, by the first processor; and in response to the second new lower bound exceeding the lower bound, setting the lower bound equal to the second new lower bound, by the first processor. Selecting a respective configuration of ancillary variables may include selecting the respective configuration of ancillary variables at random based on a probability proportional to a difference between the penalty gap and the lower bound, by the first processor. Performing a local search may include performing a tabu search. Iteratively determining the respective Ising model penalty function subject to the bounds on the programmable parameters imposed by the hardware limitations of the second processor to maximize the respective penalty gap of the respective Ising model penalty function may include: repeating the iterating, selecting, determining, backtracking, selecting, solving, setting and performing until the end condition of an earliest of: the lower bound exceeds a determined threshold, a defined time has elapsed, or a defined number of cycles has been performed. Solving a first or a second linear program may include: solving a first instance of the linear program based on an initial subset of one or more penalty function constraints; identifying a new penalty function constraint, not in the initial subset of penalty function constraints, that is violated by an initial solution to the first instance of the linear program; adding the identified new penalty function constraint to the subset of penalty function constraints to produce a revised subset of penalty function constraints; and solving a second instance of the linear program based on the revised subset of penalty function constraints. The method may further include: identifying another new penalty function constraint, not in the revised subset of penalty function constraints, that is violated by a subsequent solution to the second instance of the linear program; adding the identified another new penalty function constraint to the subset of penalty function constraints to produce a further revised subset of penalty function constraints; and solving a third instance of the linear program based on the further revised subset of penalty function constraints. The method may further include: until no subsequent new penalty function constraints is found that is violated by a solution of a most recent instance of the linear program, repeatedly: identifying a new penalty function constraint, not in a most recently revised subset of penalty function constraints, that is violated by a solution to a most recent instance of the linear program; adding the identified new penalty function constraint to the most recently revised subset of penalty function constraints to produce subsequent revised subset of penalty function constraints; and solving subsequent instances of the linear program based on respective ones of the subsequent revised subsets of penalty function constraints. Iteratively determining the respective Ising model penalty function subject to the bounds on the programmable parameters imposed by the hardware limitations of the second processor to maximize the respective energy gap of the respective Ising model penalty function may include: determining, by the at least one processor, one or more members of a feasible set for the constraint; determining, by the at least one processor, one or more members of an infeasible set for the constraint; determining, by the at least one processor, an effective energy for one or more decision variables wherein the effective energy is a marginal probability distribution for the decision variables determined by marginalizing over one or more ancillary variables; determining, by the at least one processor, an objective function having a value, the value which evaluated at the one or more programmable parameters is inversely related to a gap between the one or more members of the feasible set and the one or more members of the infeasible set, wherein the gap is related to a difference between the effective energy of at least one of the one or more members of the feasible set and the effective energy of at least one of the one or more members of the infeasible set; and determining, by the at least one processor, a minimum value of the objective function with respect to the one or more programmable parameters. Determining an objective function may include: determining, by the at least one processor, a loss function which penalizes positive values of a variable, the loss function comprising an inverse temperature parameter, the inverse temperature parameter representative of a rate of change of the loss function over a range of interest of the variable; and determining an objective function that comprises a summation of terms comprising the loss function evaluated for values representing a difference between the effective energy and a boundary parameter for each of the one or more members of the feasible set and the one or more members of the infeasible set, the boundary parameter related to a boundary between the one or more members of the feasible set and the one or more members of the infeasible set. The loss function may be a sigmoid function. The method may further include: initializing, by the at least one processor, the inverse temperature parameter; and iterating over the inverse temperature parameter, by the at least one processor, until the gap exceeds a predetermined threshold. The one or more members of the feasible set for the constraint may constitute all members of the feasible set for the constraint. Iterating over the inverse temperature parameter, by the at least one processor, until the gap exceeds a predetermined threshold may include in each iteration: incrementing the inverse temperature parameter; and using the one or more programmable parameters from the previous iteration as a starting point for the current iteration. Determining a respective Ising model penalty function subject to the bounds on the programmable parameters imposed by the hardware limitations of the second processor, may include: employing an initial subset of one or more penalty function constraints; identifying a new penalty function constraint, not in the initial subset of penalty function constraints, that is violated by an initial solution to the first instance of the problem; adding the identified new penalty function constraint to the subset of penalty function constraints to produce a revised subset of penalty function constraints; and employing the revised subset of penalty function constraints. The method may further include: generating one or more ancillary variables for each of the respective Ising model penalty functions: re-formulating, by the at least one processor, the received problem as a feasibility problem; and finding, by the at least one processor, a largest energy gap for which the feasibility problem is satisfiable. Finding a largest energy gap for which the feasibility problem is satisfiable may include: re-formulating the feasibility problem by generating one or more inequalities, one or more continuous message variables and one or more binary variables, or by generating one or more inequalities and one or more continuous message variables; determining an order; placing the inequalities in the determined order, the inequalities eliminating the one or more ancillary variables in sequence, the one or more continuous message variables comprising one or more intermediate results, and the last in the sequence of the one or more continuous message variables comprising an empty set of ancillary variables.

A method of operation in a problem solving system which includes at least a first processor and at least one non-transitory processor-readable medium communicatively coupled to the first processor and which stores at least one of processor-executable instructions or data, wherein one of a number of hardware limitations of a second processor imposes a number of bounds on a set of programmable parameters, may be summarized as including: receiving, by the first processor, a constraint; representing, by the first processor, the constraint as an Ising model penalty function and a penalty gap associated therewith, the penalty gap separating a set of feasible solutions to the constraint from a set of infeasible solutions to the constraint; and determining, by the first processor, the Ising model penalty function subject to the bounds on the programmable parameters imposed by the hardware limitations of the second processor, where the penalty gap exceeds a predetermined threshold greater than zero. The set of feasible solutions to the constraint may be enumerated by the first processor.

A system to solve problems may be summarized as including: at least one processor; and at least one non-transitory processor-readable medium communicatively coupled to the at least one processor and which stores at least one of processor-executable instructions or data, which when executed by the at least one processor causes the at least one processor to execute any of the acts described herein.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been selected for ease of recognition in the drawings.

FIG. 8 is a block of pseudocode the flow diagrams in the preceding Figures.

FIG. 10 shows two examples of constraints, the associated relations, and the complement to the relations.

DETAILED DESCRIPTION

Figure 1A:
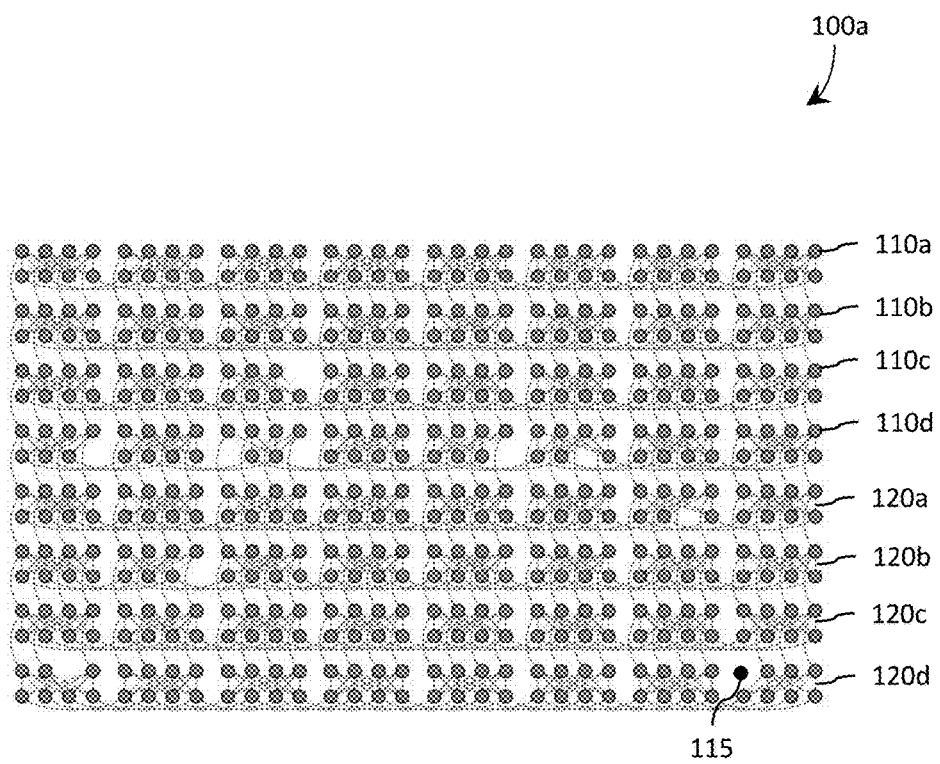
FIG. 1A is a schematic illustrating a connectivity graph for an example embodiment of quantum hardware.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures including microprocessors and drive circuitry have not been shown or described in detail to avoid unnecessarily obscuring descriptions of the embodiments of the present methods.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a processor" includes a single processor, or two or more processors. It should also be noted that the term "or" is generally employed in its sense including "and/or" unless the content clearly dictates otherwise.

The headings provided herein are for convenience only and do not interpret the scope or meaning of the embodiments.

Modeling Boolean Functions and Relations with QUBOs

Quantum annealing is a heuristic optimization approach applicable to certain discrete optimization objectives. While quantum annealing may be simulated in software (just as a simulated annealing algorithm simulates a physical annealing process), the technology described herein is related to the application of hardware that embodies quantum annealing through quantum evolution.

Quantum hardware can have restricted connectivity between variables and can be limited in the precision to which parameters defining an objective function can be specified.

Quantum hardware can support unconstrained minimization of objective functions comprising local bias values for variables (first order interactions) and pairwise interactions between variables (second order interactions). An example of the form for the objective functions is:

$$C(x|\theta) = \sum_{v \in V} \theta_v x_v + \sum_{(v,v') \in E} x_v \theta_{v,v'} x_{v'}$$

where $x_i$ is Boolean, $G=(V, E)$ is a graph defining programmable interactions and $\theta$ are programmable parameters.

FIG. 1A shows a connectivity graph 100a for an example embodiment of quantum hardware. Vertices such as 110a, 110b, 110c and 110d indicate Boolean variables, and edges such as 120a, 120b, 120c and 120d indicate programmable coupling values. In addition to edges (such as edges 120a through 120d), linear terms can also be programmable. Missing variables such as variable 115 can be the result of fabrication defects in the quantum hardware.

Vertices (such as vertices 110a through 110d) can indicate spin-valued variables represented by programmable qubits in the quantum hardware. Edges (such as edges 120a through 120d) can indicate programmable couplers in the quantum hardware. The connectivity graph G of FIG. 1A can be a lattice of unit cells, for example.

The technology described herein can leverage the heuristic minimization of the above equation to solve a broader class of problems. One challenge in this regard can be finding ways to reduce higher-order variable interactions in a given problem to second order, and with a connectivity structure compatible with the quantum hardware, such as the connectivity of FIG. 1A. A second challenge can be finding ways to frame the problem so that the minimization is robust to misspecification and/or low precision of the programmable parameters $\theta$.

Constraint satisfaction problems (CSPs) are a suitable example in the broader class of problems to be solved by quantum hardware. CSPs can be cast as optimization problems requiring only low precision of the programmable parameters. Moreover, there can be many useful constraints that involve only a small number of variables, which can mitigate the challenges of graph embedding.

The technology described herein relates to a method for defining penalty functions for arbitrary constraints (both linear and non-linear), the penalty functions allowing CSPs to be solved by unconstrained optimization. In one approach, the expression of arbitrary connectivity limitations between variables can be enforced. One aspect is the modeling of a relation over a set of Boolean variables that can represent a constraint or a Boolean-valued function.

Consider a CSP involving a finite set of binary variables. The CSP involves a set of spin variables $s_i \in \{-1,1\}$, $i=1 \ldots n$, and a set of constraints. In some examples, each constraint can constitute a configuration of variables allowed by the constraint, and each constraint can correspond to a non-empty subset $F_j$ of $\{-1,1\}^n$. In this way, each constraint can be expressed as a configuration of spin variables. There can be other ways to express constraints.

The method constructs an Ising-model penalty function for each constraint, the penalty function having the form:

$$\min_a Pen_{F_j}(s, a) \begin{cases} = 0 & \text{if } s \in F_j \\ \geq g & \text{if } s \notin F_j \end{cases}$$

where $g>0$ and is known as the gap of the penalty function.

The variables s are known as decision variables, and are the variables upon which the constraint $F_j$ depends.

The variables a are known as ancillary variables. One reason for introducing ancillary Boolean variables is to be able to represent some constraints in quadratic form.

In practice, once the decision variables have been allocated to vertices or qubits in the quantum hardware, the ancillary variables can be allocated to the remaining qubits.

While a decision variable can be involved in one or more constraints, the sets of ancillary variables for different constraints are disjoint.

A relatively larger gap can make it more likely that the quantum hardware will find a solution satisfying the constraints. A relatively larger gap can also offer protection against noise and the effect of limits on the precision of the programmable parameters.

Figure 1B:
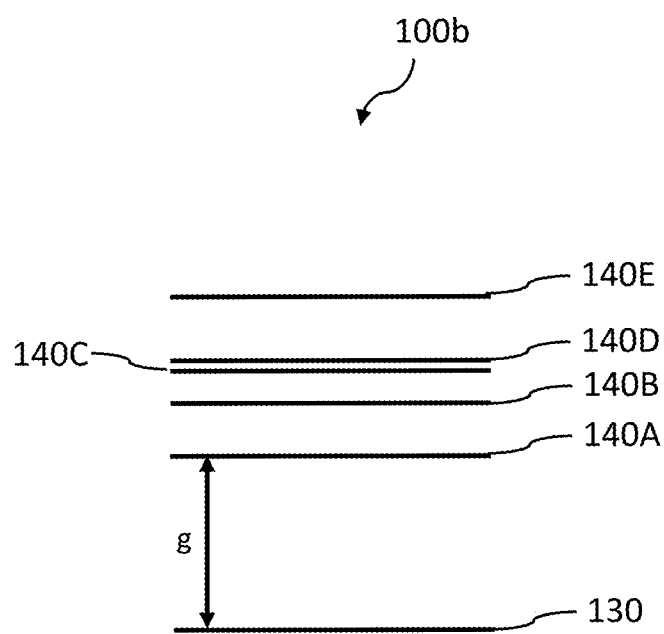
FIG. 1B is a schematic illustrating valid and invalid states separated by an energy gap.

FIG. 1B is a schematic illustrating valid and invalid states separated by an energy gap. Since a relatively large energy gap can mitigate the effects of control errors and finite temperature, FIG. 1B is an element of a prescription for robust penalty functions.

FIG. 1B shows valid states 130, and invalid states 140A through 140D. There is an energy gap g between valid states 130 and invalid states 140A through 140D.

The penalty functions for each constraint can be added to obtain an Ising model for the system of decision and ancillary variables. For a configuration of the decision variables that satisfies all the constraints, there exists a setting of the ancillary variables that makes all the penalty functions identically zero. A configuration of the decision variables violating at least one constraint will have an energy$\geq g$. A ground state of the system solves the CSP if a solution exists.

The approach described herein can be used to solve Constrained Optimization Problems (COPs) by adding, to the set of constraints $F_j$, an objective function to be minimized over the feasible configurations. This can be accomplished by adding more terms to the Hamiltonian expressing the objective function. In some examples, the Hamiltonian and the constraints included therein are in Ising form. It can be necessary to scale the objective function so that it does not overcome the penalty functions and cause the appearance of ground states that do not satisfy the constraints. A larger gap can provide for improved scaling of the objective function.

The approaches described herein can be applicable to any hardware device providing sparse pairwise variable interaction.

The approach described herein seeks to construct a penalty function for a given constraint with the largest possible gap, subject to the bounds imposed by the programmable parameters of the hardware. The approach can exploit the sparseness of the hardware graph G.

The approach relates to a method for finding Ising representations of constraints with large classical gaps.

The method maximizes the penalty gap g separating solutions satisfying the constraints from those not satisfying the constraints, subject to the bounds on the programmable coefficients $h_i$ and $J_{i,j}$ of the Ising model. Finding the programmable coefficients that maximize the penalty gap g is a constrained optimization problem as follows:

$$\max_{g,\theta} g$$

subject to $\langle \theta, \phi(s, a) \rangle \geq 0$ $\langle \theta, \phi(s, a) \rangle \geq g \quad \forall s \notin F, \forall a$ $\exists a: \langle \theta, \phi(s, a) \rangle = 0 \quad \forall s \in F$ $\underline{\theta} \leq \theta \leq \overline{\theta}$ The constraints in the equalities and inequalities above separate feasible configurations from infeasible configurations while ensuring the minimum penalty for feasible configurations is zero.

It is not known which of the settings of ancillary variables yields zero energy for a particular feasible configuration. Solving for the programmable parameters given a setting of the ancillary variables for a feasible configuration can be accomplished by linear programming.

Using binary variables and linear constraints, the optimization problem can be transformed into a mixed integer linear programming (MILP) problem, and solved using conventional MILP solvers provided the problem is small enough. Conventional solvers can solve the MILP problem if the number of vertices $|V(G)|$ of G (that is, the order of G) is less than about ten. A shortcoming of conventional MILP solvers is that the solvers scale poorly and can be ineffective for larger problems.

Example of Ising Model Representation of a Simple Constraint

Consider an example of a 3-bit parity constraint. There exists a set of four feasible solutions, each solution consisting of spin triplets with an even number of positive spins. Representing the 3-bit parity constraint as an Ising model requires at least one ancillary bit. In some examples, the bound constraints on the programmable coefficients are $h_i \in [-2, 2]$ and $J_{i,j} \in [-1, 1]$ for each edge $(i,j)$. If G is the complete graph on 4 nodes $K_4$, then the optimal penalty function with gap 1 can be defined as:

$$(s_1+s_2+s_3-2a+1)^2/4$$

The same gap can be achieved if the hardware graph is the complete bipartite graph $K_{3,3}$. Two qubits on the right side of the partition can be identified with two qubits on the left side using ferromagnetic couplings. The first two decision variables can be mapped to these two pairs of coupled qubits so that $s_1=a_1$ and $s_2=a_2$, while $s_3$ and $a_3$ can be mapped to the remaining two qubits. The corresponding Ising model is as follows:

$$0.5(s_1+s_2+s_3)-a_3+s_1(-a_1+0.5a_2-a_3)+s_2(-a_2-a_3)+s_3 (0.5a_1+0.5a_2-a_3)$$

Using the MILP or SMT model, the decision qubits can be placed on one side of the graph and the ancillary qubits on the other side, as follows, resulting in a gap of 2:

$$-a_1+a_2-a_3+s_1(a_1+a_2+a_3)+s_2(-a_1+a_2+a_3)+s_3(a_1+a_2-a_3)$$

Linear Programming with Relaxation

The present techniques relate to finding instances of quadratic binary optimization QUBO problems. An example embodiment of the techniques expressed as a method in four parts is shown in FIGS. 2A through 2D.

Figure 3:
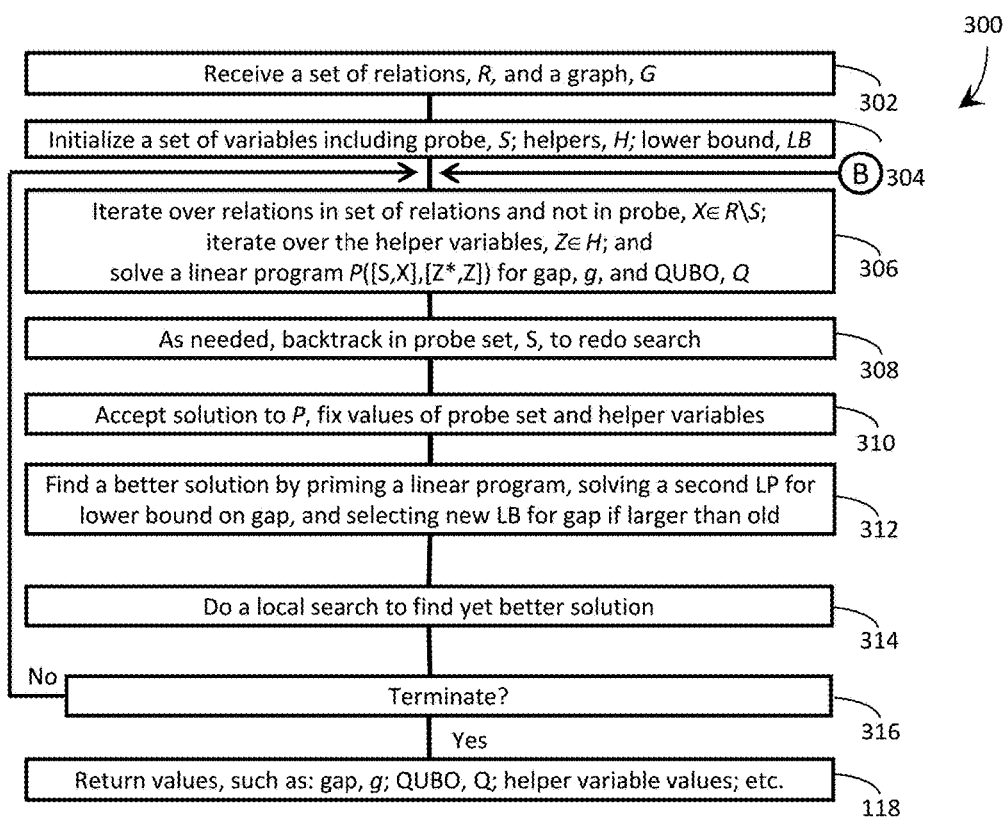
FIG. 3 is a flow-diagram showing a method for finding a QUBO and associated gap values.

In some embodiments, these QUBO problems are used in further techniques to map satisfiability problems and constraint satisfaction problems to optimization problems. For example, a satisfiability problem can be broken up into smaller portions that each includes a set of relations. This set of relations can be used to find a QUBO problem (FIG. 3). Alternatively, in some embodiments, a constraint problem is transformed into an optimization problem.

In the following description, the term helper variables is used interchangeably with the term ancillary variables.

Figure 4:
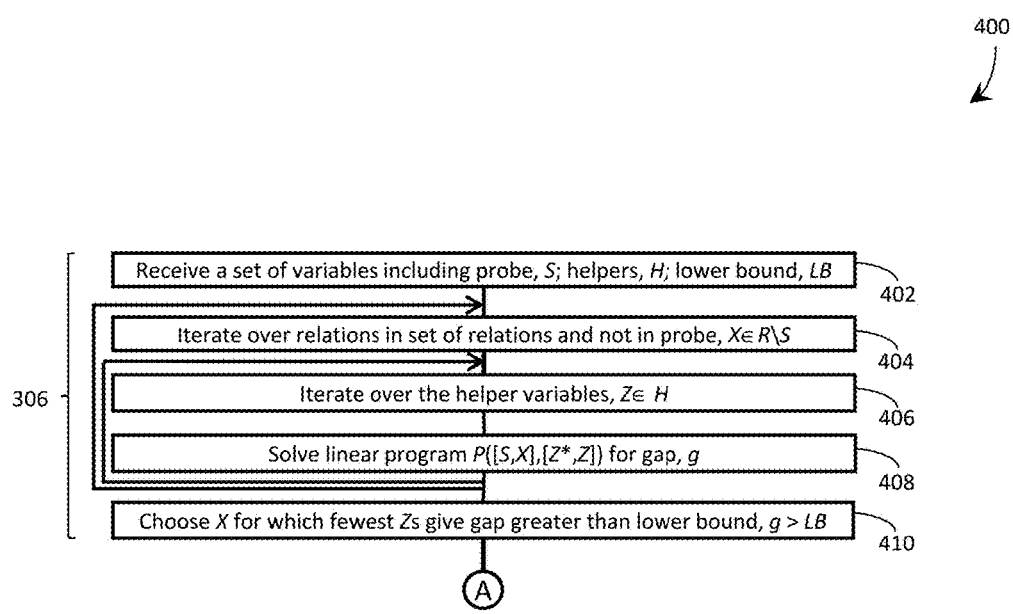
FIG. 4 is a flow-diagram showing a method for searching for QUBOs and associated gap values.
Figure 5:
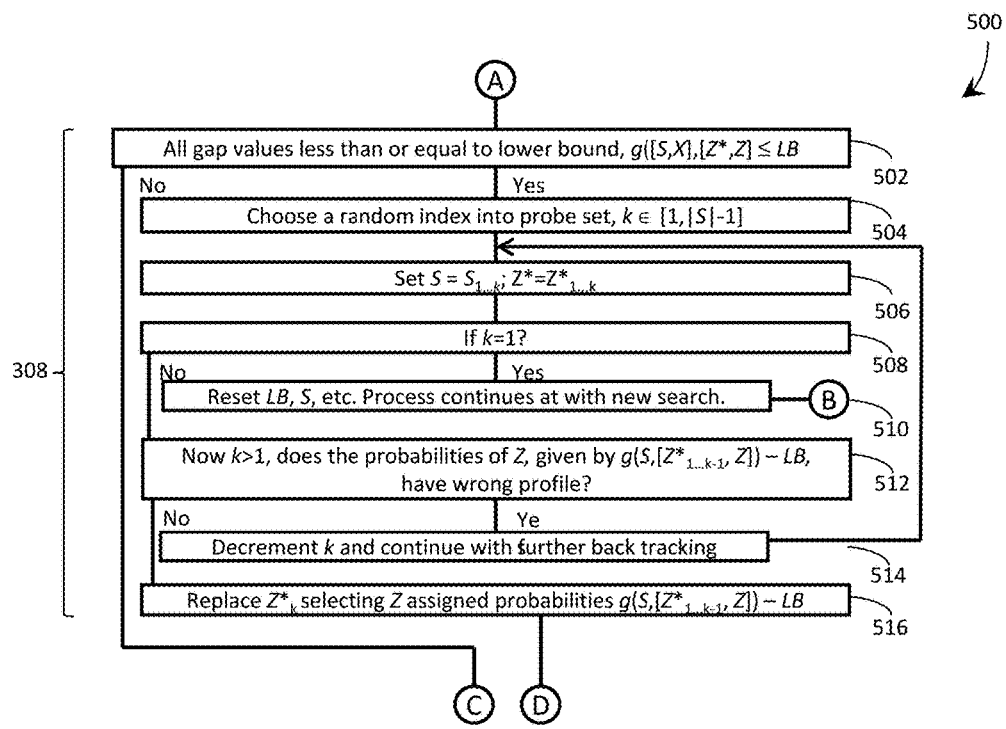
FIG. 5 is a flow-diagram for testing the search results and as needed backtracking.
Figure 6:
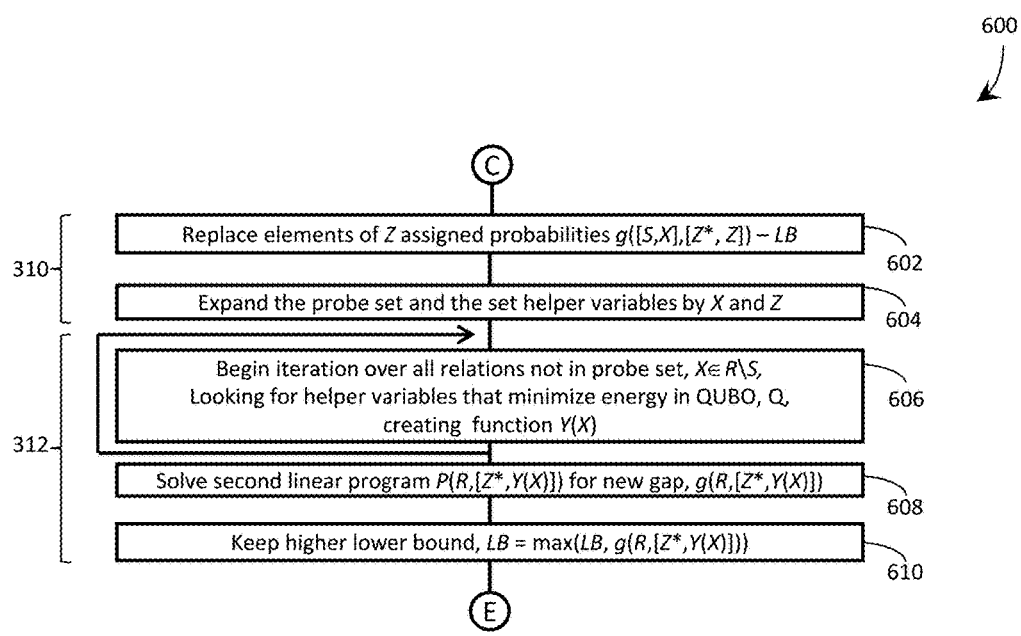
FIG. 6 is a flow-diagram for accepting a solution from the search and looking for improved solutions.
Figure 7:
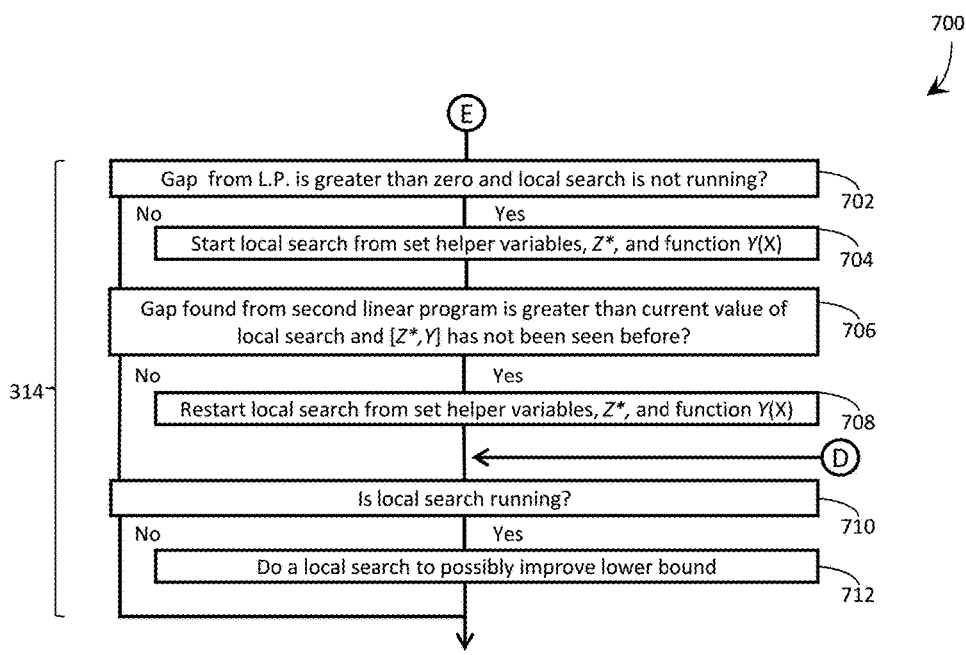
FIG. 7 is a flow-diagram for looking for still improved solutions by local search.
Figure 9:
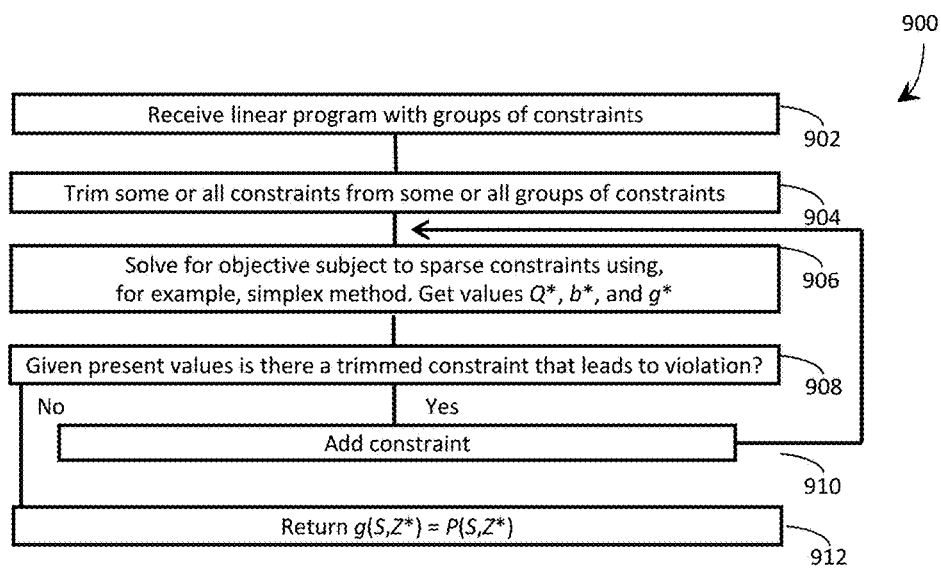
FIG. 9 is a flow-diagram for delayed constraint generation when solving linear programming equations.

A method of searching for QUBO problems and associated gap values is shown in FIG. 4. The search is over the set of relations and a set of helper variables. The search result is tested, and the method backtracks if needed, for instance as illustrated in FIG. 5. A solution from the search is accepted and the method seeks improved related solutions for instance as illustrated in FIG. 6. Still improved solutions are sought by local searching as illustrated in FIG. 7. The methods from the preceding figures are shown as pseudo-code in FIG. 8. In some embodiments, this process can be aided by improved techniques to solve linear programs (FIG. 9).

For the method illustrated in and described with respect to FIGS. 3 through 9, as with other methods taught herein, the various acts may be performed in a different order than that illustrated and described. Additionally, the methods can omit some acts, and/or employ additional acts. One or more of these acts may be performed by or via one or more circuits, for instance one or more processors (for example, a digital processor such as a microprocessor, an analog processor such as a quantum processor, and a hybrid computer including a digital processor and an analog processor).

Figure 14:
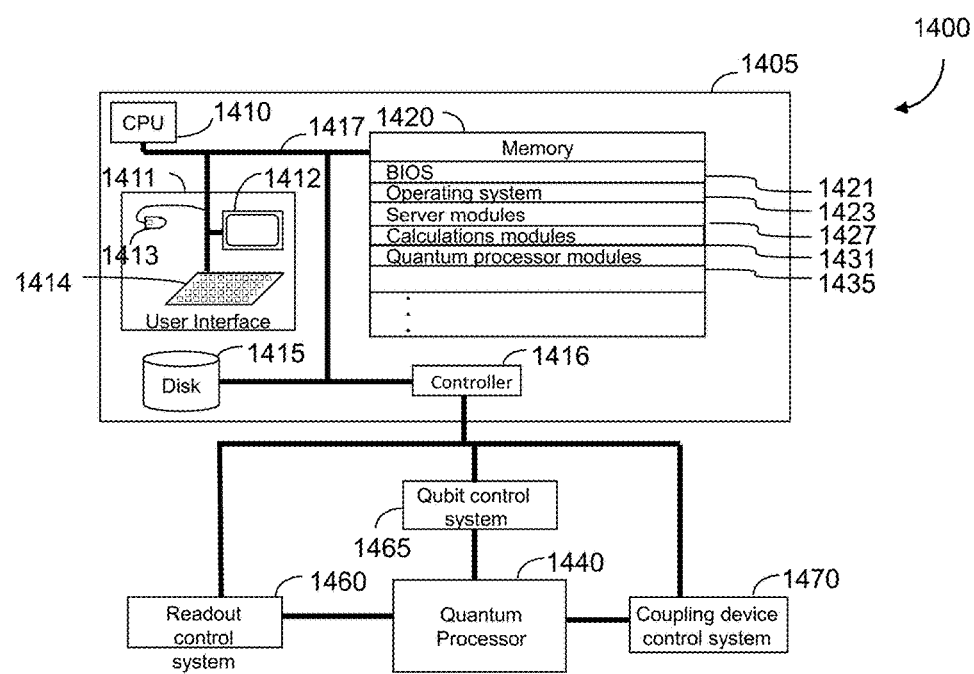
FIG. 14 is a schematic diagram of an exemplary hybrid computing system including a digital processor and quantum process that may be used to perform processing tasks described in the present disclosure.

The methods can be implemented on a system comprising a digital computer communicatively coupled to a quantum computer, such as illustrated in FIG. 14 and described below in reference to FIG. 14. The quantum computer can comprise a quantum processor, a portion of which is illustrated in an example embodiment in FIG. 15 and described below in reference to FIG. 15. The example of the system comprising a digital computer coupled to a quantum computer is used in the description of the methods for finding QUBO problems described below in this application.

FIGS. 2A through 2D are flow-diagrams showing a method in four parts 200a through 200d for finding a QUBO problem in accordance with embodiments of the present invention.

Figure 2A:
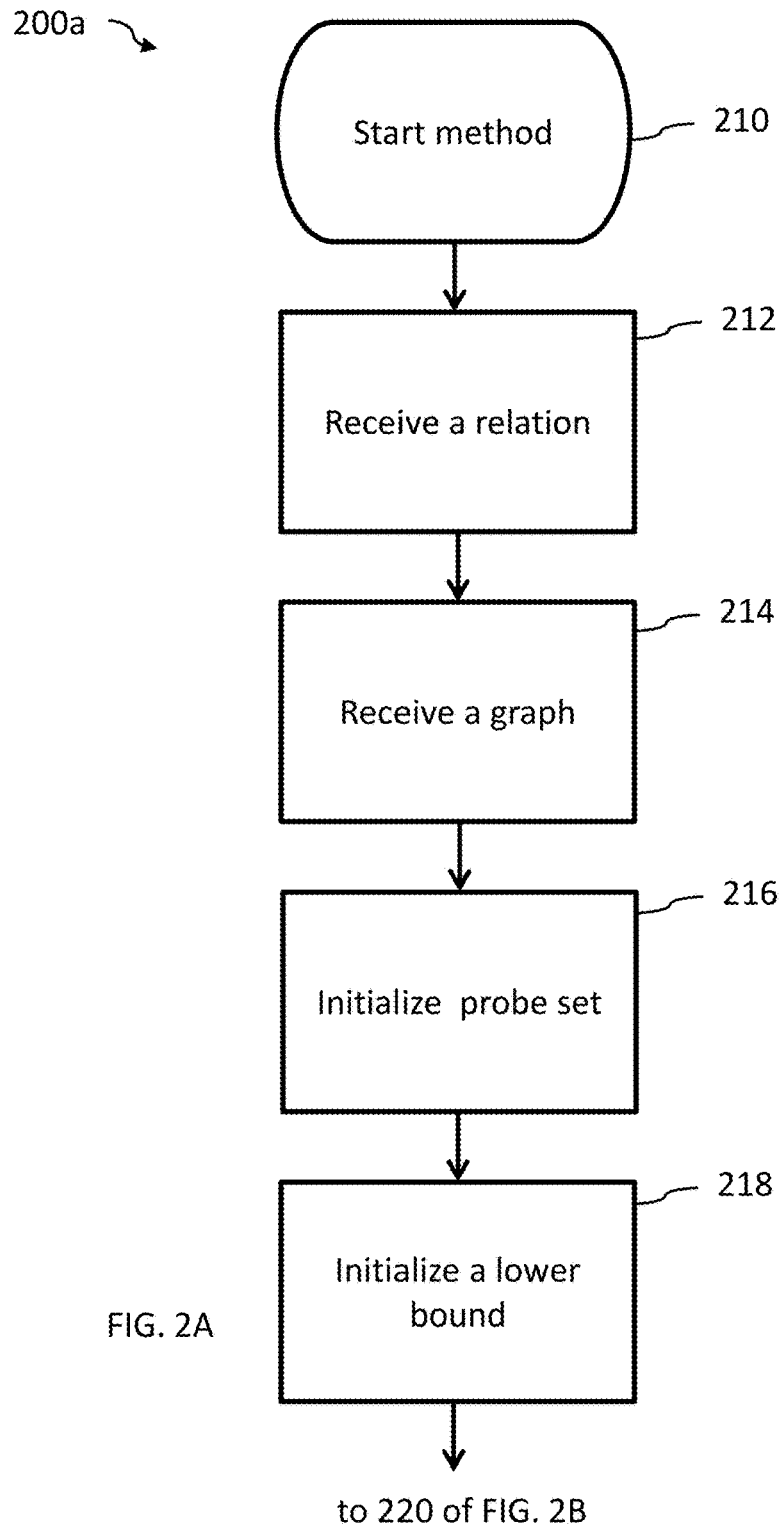
FIGS. 2A through 2D are flow-diagrams showing a method in four parts for finding a quadratic binary optimization problem (QUBO) problem in accordance with embodiments of the present invention.

Part 200a of the method is illustrated in FIG. 2A and describes the initialization of the process. The method starts at 210 and proceeds to 212. At 212, the system receives a relation. At 214, the system receives a graph, such as the graph illustrated in FIG. 1A.

At 216, the system initializes a probe set as described in more detail below. At 218, the system initializes a lower bound.

Figure 2B:
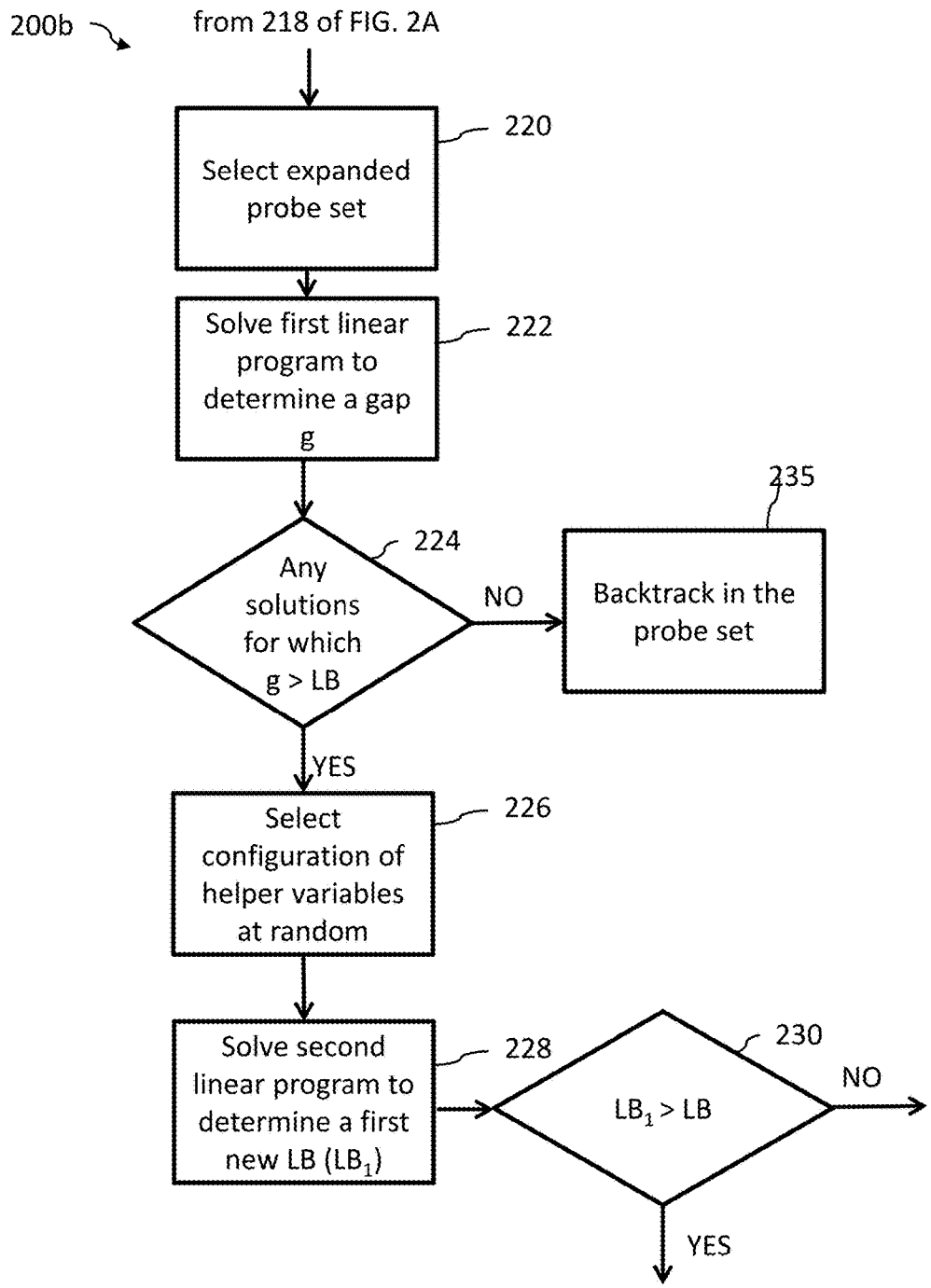

Part 200b of the method is illustrated in FIG. 2B and describes the determining by the system of a new lower bound through solutions to a first linear program and a second linear program.

At 220, the system selects an expanded probe set. At 222, the system solves a first linear program to determine a gap g. At 224, if there are no solutions for which the gap is greater than the lower bound, then the system proceeds to 235 and backtracks in the probe set. If there is at least one solution for which the gap is greater than the lower bound, then the system proceeds to 226 and selects a configuration of helper (or ancillary) variables at random.

At 228, the system solves a second linear program to determine a new lower bound. If the new lower bound exceeds the previous lower bound, then the system proceeds to 240 of FIG. 2C.

Figure 2C:
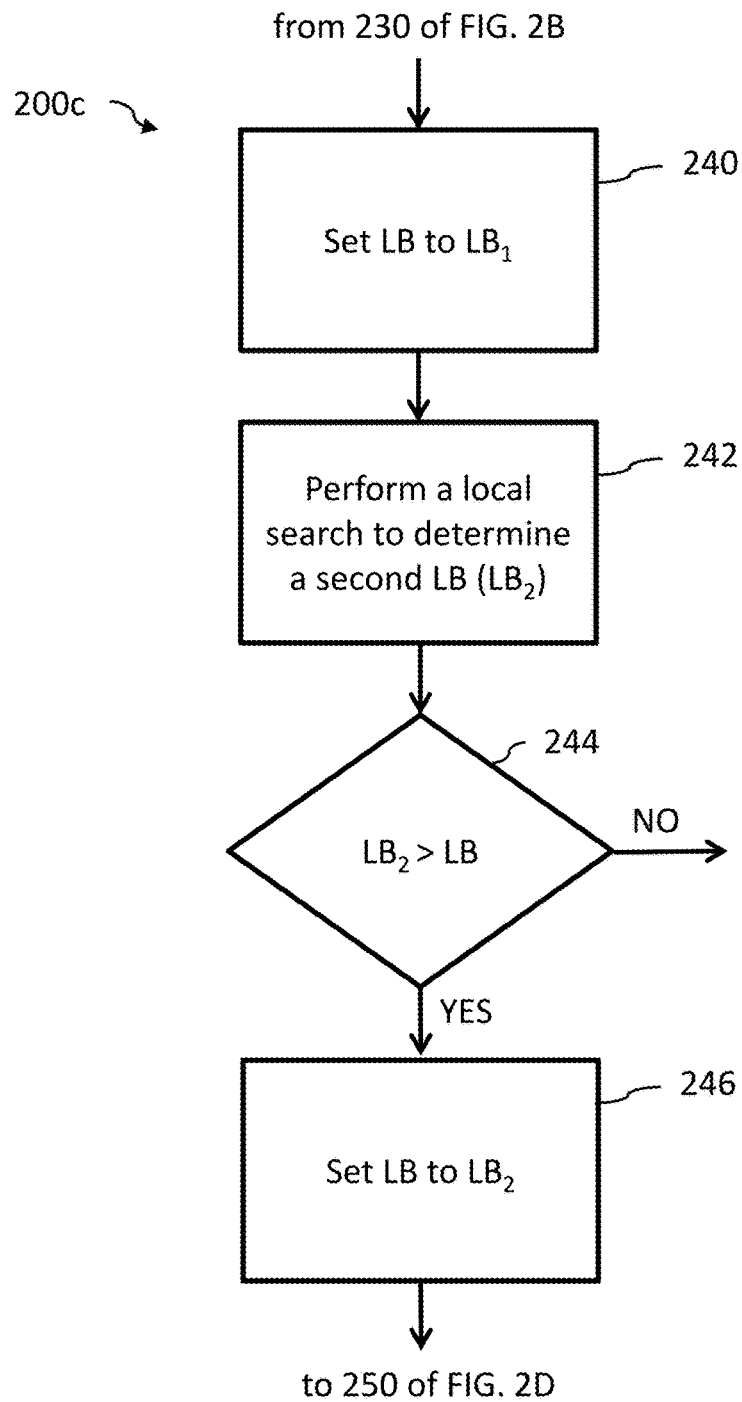

FIG. 2C illustrates part 200c of the method in which the system performs a local search to determine a second lower bound.

At 240, the system sets the present lower bound to the new lower bound found in part 200b. At 242, the system performs a local search to determine a second lower bound. At 244, if the second lower bound is greater than the current lower bound, the system proceeds to 246, sets the current lower bound equal to the second lower bound, and then proceeds to 250 of FIG. 2D.

Figure 2D:
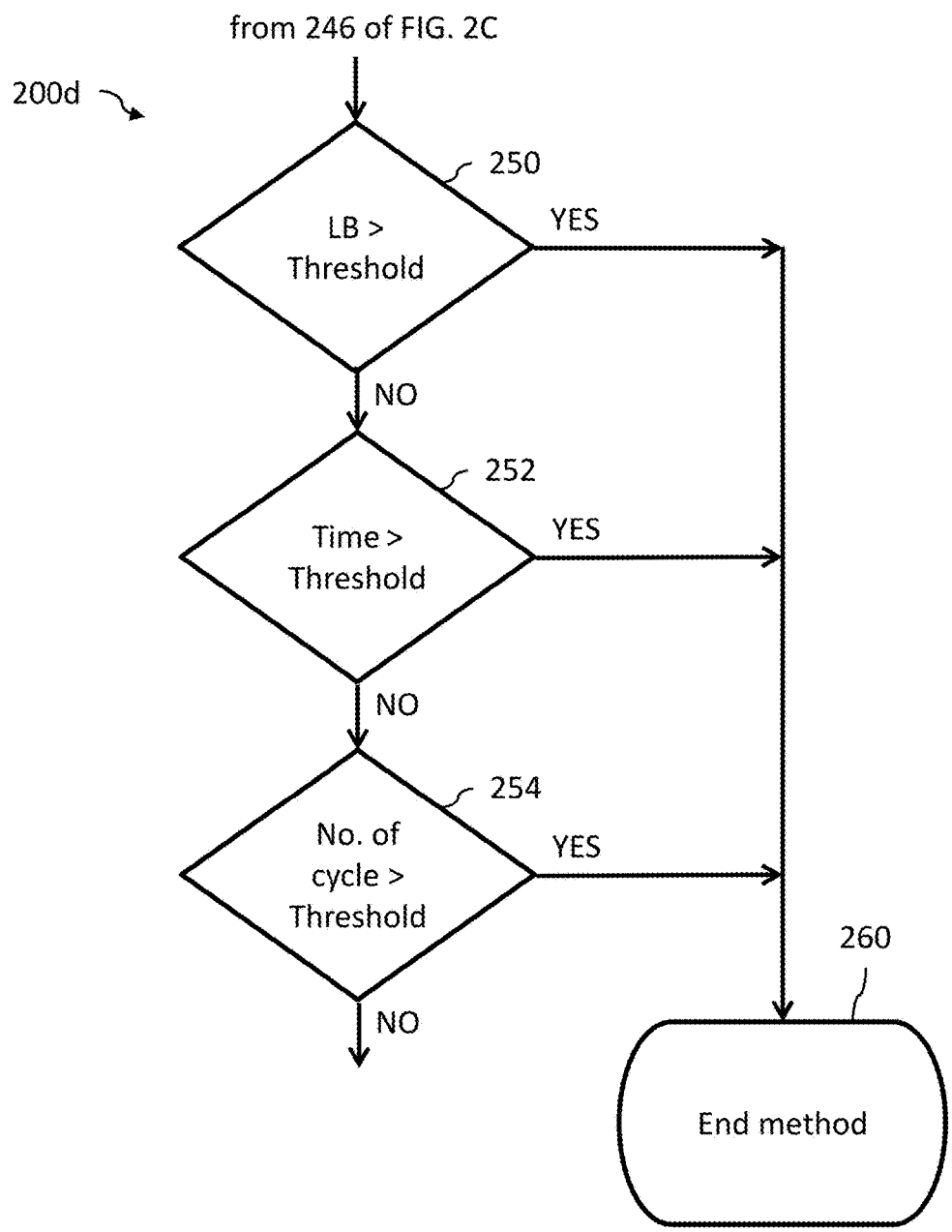

FIG. 2D illustrates part 200d of the method and describes the termination conditions. At 250, 252 and 254 respectively, the system checks for whether the current lower bound, the processing time or the number of cycles has exceeded a determined threshold. If a threshold has been exceeded, the system proceeds to 260 and the method terminates until invoked again.

FIGS. 3 through 9 are flow-diagrams showing in more detail a method for finding a QUBO problem in accordance with embodiments of the present invention.

FIG. 3 shows a method 300 for finding a QUBO problem in accordance with embodiments of the present invention. At 302 of method 300, the system receives a set of relations R and a graph G. In some implementations, the system is a QUBO problem finder, and the QUBO problem finder receives the set of relations R and a graph G. In some implementations, the set of relations R is expressed as an array of binary values. In some implementations, the graph G is expressed as an adjacency matrix.

At 304, the system initializes a set of variables. These variables include a probe set S, the probe set S comprising a set of relations that is expanded in the method 300. These variables include helper variables H whose value is not specified but will be used to construct the QUBO problem. The system also sets a lower bound on the value of a gap value. In method 300 and associated methods, the value of the gap is of interest.

At 306, an iterative portion of the method begins. The system searches over a set of relations and variables to find a lower bound on the maximum gap in a linear program. This search is made of over a tree-like structure, for example, a partially ordered set, or poset.

After the search, at 308, the system backtracks to consider if a new maximum gap can be determined in a previously searched part of the tree structure. At 310, once a solution has been found, the system sets the helper variables for all the relations in the input set of relations. In addition, at 312, the system seeks good solutions by solving further linear programming problems and/or searches. At 314, the system performs a local search to improve on solutions found thus far.

Iteration over 306 to 316 continues until a termination condition, as tested by 316, is reached. At 318, a set of values is returned by the computer (or QUBO problem finder), including: the best gap found in the method 300, a QUBO problem associated with the best gap, and a set of relations.

The process in method 300 is an example of moving from a constraint focused problem to an optimization focused problem. The optimization problem of interest here is QUBO, but a person of ordinary skill in the art will appreciate that a QUBO problem can be mapped to an Ising problem or to a weighted MAX-2-SAT, and vice versa, and between the three classes of problems. Elsewhere in this application, an Ising model is used to describe the problem of interest. The systems and methods for QUBO problem finding and Ising model finding can be the same.

Some computing hardware, such as a quantum annealing device, and some computational techniques, such that practice energy minimization techniques cannot natively encode constraints. Constraints are dealt with by assigning the disallowed configurations energy penalties. In moving from satisfaction and constraint problems to optimization problems, the energy scale of the penalties must be considered. Thus finding a QUBO problem and an associated lower bound on the gap is useful. In some embodiments, helper or ancillary variables are introduced to enforce the constraints or construct a suitable gap.

FIG. 4 shows a method 400 for searching over a tree like structure for a QUBO problem and an associated gap, in accordance with embodiments of the present invention.

A set of probe relations S are tested and expanded in method 400. In some embodiments, the search is over a partially ordered set, or poset. At 402, the system receives a set of variables. These variables include the probe set, S; a set of helper variables, H; a lower bound on the gap, LB; and the like.

At 404, an iterative loop begins. The iterative loop 404 is over the relations X in the set of relations R that are not probe set, S. These relations are over the input variables.

At 406, a nested iterative loop begins. The nested iterative loop 404 is over the relations Z associated with the helper variables.

At 408, the system solves a linear program P to obtain a gap and a QUBO problem.

In some embodiments, the linear program P is over the variables X and the helper variables Z. This can have the form:

max $g$ subject to $E(X,Z|Q) \geq b \quad \forall X \in R, Z \in H$ $E(X,Z|Q) \geq b+g \quad \forall X \in R^C, Z \in H$ $E(X,Z^*|Q) \leq b+g \quad \forall X \in S$ and subject to bounds on Q, where g is a quantity of interest called the gap, R is the set of relations and $R^C$ its complement, H is the set of helper variables, $E(X,Z|Q)$ is the energy of the QUBO, Q.

For a given Q, the energy for configurations of variables and helper variables is:

$$E(X, Z | Q) = \sum_{i \leq j} Q_{ij}(X, Z)_{ij}$$

In some embodiments, Q is an upper diagonal matrix where the non-zero elements of Q correspond to edges in the graph G. In some embodiments, the matrix Q is symmetric. The elements on the diagonal can be non-zero. In some embodiments the possible connections between the elements of the graph G are reduced. For example, the graph may be a bipartite graph and one node is connected to at most half the nodes in the graph. In some embodiments, the limitations on these graphs can be overcome by the addition of helper variables.

In solving the linear program P, the gap g is determined, as well as the set of variables Z*. The iteration continues over the variables X in R but not in probe, S and over the helper variables, Z. At 410, the system selects the configuration of X that gives the fewest helper variables with a gap greater than the lower bound, LB. Note the fewest can be zero. Processing continues is at 502.

FIG. 5 shows a method 500 illustrating an example of a portion of the method 100 from FIG. 1, in accordance with embodiments of the present invention. At 502, the system receives a plurality of gaps for a given set of variables and helper variables, and compares them to the current lower bound value, LB. If all of the gaps are not less than or equal to the lower bound, then control passes to 402 for further processing. If all the gaps are less than or equal to the lower bound, then control passes to 402, where backtracking starts. At 504, the system chooses a random index into the probe set. That is, the system selects a positive integer, k, between 1 and the number of elements in the probe. In some embodiments, the last member is excluded. At 506, the system redefines the probe to be the first k elements of probe. The system makes a similar truncation of the helper variables. At 508, the system tests to determine if the random index equals one. If the random index equals one at 508, then at 510 the lower bound on gap is reset, and processing continues at 106. If the random index does not equal one at 508, then at 512 the system determines whether the profile of the probabilities associated with each helper variable is wrong. That is, assign to each helper variable a probability proportional to $g(S[Z^*_1 \ldots _{k-1}, Z])$–LB. If the profile is wrong, for example, all the probabilities are less than zero, then control passes to 514. At 514, the system decrements the index k, and returns control to 506 to continue processing. That is, backtrack further. If it is determined that the profile is not wrong at 512, the profile of the probabilities is acceptable. So control passes to 516 to replace the current helper variable $Z^*_k$ with a sampled helper variable Z selected from the set of helper variables according the probability assigned to each Z that is proportional to $g(S, [Z^*_1 \ldots _{k-1}, Z])$–LB.

FIG. 6 shows a method 600 illustrating examples of portions of the method 300 from FIG. 3, in accordance with embodiments of the present invention. As noted above, control may pass to 602 in response to a determination at 502 that all of the gaps are not less than or equal to the lower bound. At 602, the system replaces the current helper variables by selecting Z with probability that is proportional to $g([S,X],[Z^*,Z])$–LB. That is once X is chosen, in FIG. 2, each corresponding Z is given a probability and randomly chosen according to the probabilities.

At 604, the system expands the probe by one variable to include the current variable, X, and expand the set of fixed values for the helper variables by one helper variable, Z. That is S=[S,X], Z=[Z*,Z].

In some embodiments, the method 600 may include finding a better solution. For example, at 606, the system begins an iterative loop over the variables in the relation R and not in the probe set, S. In the iterative loop 606, let Y(X) be the arguments drawn from the set of helper variables that minimizes the energy of the QUBO that is part of the solution to P(S,Z*). That is, find minimum of E(X,Z|Q) by varying Z and record the value of Z calling it Y(X). This value of the helper variable will prime a linear program.

At 608, the system solves another linear program to find an improved solution. In some embodiments and unlike in 106 the linear program is over all the relations in the set R and not just the in probe set S. Further, this linear program is over the set of helper variables determined as extended by the helper variable that minimizes the objective function from 606. The system solves P(R,[Z*,Y]) for a new lower bound, g(R, [Z*, Y]).

At 610, the system compares the newly obtained lower bound, g(R,[Z*,Y]), to the current value of the lower bound, LB and retain the maximum value. Thus the highest value for the lower bound is built up with iteration.

FIG. 7 shows a method 700 of looking for still improved solutions by a local search in accordance with embodiments of the present invention. At this point good solutions have been found, that is, the helper variables are defined with respect to all relations in the set of relations R, and the gap is positive. The solution may be improved by a locale search procedure.

The method may include examination of local searches such as tabu searches, genetic algorithms, simulated annealing and the like. Tabu search is a heuristic search technique in which the search avoids getting trapped by prohibiting moves that take the search to points in the solution space previously visited. Moves that reverse direction, or bring the search back to previously visited location, are not allowed. For the tabu search, the search space comprises the relations in the set of relations R, and the helper variables, H.

In simulated annealing, there is an energy function is to be minimized. The goal is to bring the system, from an initial state, to a state with a low energy. At each operation, the method considers some neighboring states of a current state. The method probabilistically decides between moving the system to a neighboring state, or staying in the current state. These are initially such that probabilities of transiting to a higher energy state are possible but ultimately only transitions to lower energy states are contemplated.

Genetic algorithms are heuristic search techniques that mimic the process of natural selection. Solutions are bred, evaluated and bred again. In genetic algorithms, the starting point of the search is given. A local search from two points in the solution space may arrive at a different solutions.

At 702, the system tests to see whether the gap determined by solving linear program is greater than zero and a local search is not running. If not, the method continues at 706. If yes, then at 704 the system starts a local search around the defined helper variables Z* and the function Y. In some implementations, the local search can change a portion of the defined helper variables Z* up to and including all the bits that correspond to a row in the set of relations R. At 706, the system determines whether the gap found from the linear program is greater than current value of local search and the point in the solution space [Z*,Y] has not been seen before. If so, then processing continues at 708, and if not control passes to 710. At 708, the system re-starts the local search from [Z*,Y]. The method previous to 710 includes 716 from method 700 and 706. At 710, a determination is made as to whether the local search is running. The local search can be run in parallel to the method 100. If the local search is running, control passes to 712 where a round of a local search is made to improve the lower bound. Control then passes to 316 (FIG. 3) where processing continues. If it is determined at 710 that the local search is no running, control passes directly to 316 (FIG. 3), with performing the round of local search at 712.

FIG. 8 is a block of pseudocode for executing the methods of the flow diagrams in the preceding figures in accordance with embodiments of the present invention. The pseudocode provides a more compact description of the methods disclosed. However, not all embodiments of the methods are illustrated by block 800. For example, missing from method 300 are the returned values, and, in method 700, the local search is a tabu search and rather than a genetic algorithm or simulated annealing. In some implementations of method 300, there are two different linear programs that are solved. For example, in method 400, the finding of the gap in the search over the relations and helper variables includes a linear program.

In some embodiments, the solving of the linear program involves delayed constraint generation.

FIG. 9 shows a method 900 to implement a form of delayed constraint generation in accordance with embodiments of the present invention. At 902, the system receives a linear program with groups of constraints. An example of a linear program is provided in method 400 at 408. Solving a linear program involves finding an optimal solution of a linear objective function subject to linear constraints expressed as equalities and inequalities. These constraints can be divided into groups for example, a group for equality and a group for inequalities. Alternatively or additionally, there can, for example, be a group for variables and a group for helper variables.

At 904, the system trims the constraints in the groups of constraints. In some implementations, at least one constraint is trimmed from each group of constraints. In some implementations, the constraints for trimming are found in one or more groups of constraints but one or more groups of constraints are left intact. For example, in the set of equations above that describe the linear program P, the one or more constraints are left in the first to groups of constraints all the constraints are left in third group, $E(X,Z^*(X)|Q) \leq b+g$.

At 906, the system solves the linear program. In some implementations a simplex method can be used. In some implementations, a CPLEX technique can be used. The IBM ILOG CPLEX Optimization Studio, is available from International Business Machines Corp., of Armonk, N.Y., US. Other implementations are found with, or implemented in, other mathematical software such as Maple, computer algebra systems, by Waterloo Maple Inc. of Waterloo, ON, Canada, and Matlab, numerical computing environment, by Mathworks of Natick, Mass., US.

At 908, the system uses the instant values of the solution to see if any previously trimmed constraint can be found that violated by the instant values. If there is a trimmed constraint that leads to violation, the constraint that is violated is added at 910, and control returns to 906 to solve the linear program again. If there is not a trimmed constraint that leads to violation, then control passes to 912, where a solution to the linear program has been found at the present values and can be returned. In some implementations, the number of constraints generated and used is kept constant. As new constraints are needed constraints are discarded. The older, meaning the last time it was found to be binding in the linear programming solver, the constraint the more likely the constraint is to be discarded.

FIG. 10 shows to examples of constraints, the associated relations, and the complement to the relations in accordance with embodiments of the present invention. At 1000 is an illustration of constraints, the associated relations, and the complement to the relations. A constraint on a set of binary variables is shown at equation 1002. The parity of the variables must be even. The relations associated with that constrain are shown in set of relations R in matrix 1004. Note each row is of even parity. The complements to the relations are shown in set of relations $R^C$ in matrix 1006. Note each row is of odd parity.

At 1050 is an illustration of constraints associated with a satisfaction problem, the associated relations, and the complement to the relations. A constraint on a set of binary variables is shown by equation 1052. The disjunction of variables must evaluate to unity or true. The relations associated with that constrain are shown in set of relations R in matrix 1054. The complements to the relations are shown in set of relations $R^C$ in matrix 1056. Note how there is only one disallowed configuration. These examples can be used in methods described herein.

Satisfiability Modulo Theory (SMT) Solver with Variable Elimination

The techniques described in the present application relate to finding Ising representations of constraints with large classical gaps. The Ising model described previously can be rewritten as follows to emphasize the linear dependence of the Ising energy on its parameters:

$$\text{Pen}(z|\theta) = \langle \theta, \phi(z) \rangle$$

When z=(s, a), some vertices V(G) of the graph G can be identified as representing decision variables s, and other vertices can be identified as representing ancillary variables a. Each vertex, or node, is associated with a qubit in the physical device. Therefore, each decision variable and each ancillary variable is assigned to a particular qubit in the device.

Typically, there are upper and lower bounds on the values of the programmable coefficients $h_i$ and $J_{i,j}$ of the Ising model. In an example hardware implementation, the bounds on the programmable coefficients are as follows:

$$h_i \in [-2,2]$$

$$J_{i,j} \in [-1,1]$$

In one implementation, the total number of variables (the sum of decision variables and ancillary variables) can be less than 40, and the subgraph $G_a$ induced by the ancillary variables has low treewidth. Treewidth can be defined in several equivalent ways, for example from the size of the largest vertex set in a tree decomposition of the graph. For this implementation, the method can efficiently enumerate the smallest k energy states of any Ising model in subgraph $G_a$ for, say:

$$k \leq 10{,}000$$

In one implementation, the graph G comprised N×N tiles of complete bipartite graphs $K_{4,4}$, and the corresponding treewidth was 4N. In an example implementation in which N=4, the treewidth of $G_a$ is at most 16.

The method maximizes the penalty gap g separating solutions satisfying the constraints from those not satisfying the constraints, subject to the bounds on the programmable coefficients $h_i$ and $J_{i,j}$ of the Ising model.

To recap the model described above, finding the programmable coefficients that maximize the penalty gap g is a constrained optimization problem as follows:

$$\max_{g,\theta} g$$

subject to $\langle \theta, \phi(s, a) \rangle \geq 0$

-continued $$\langle \theta, \phi(s, a) \rangle \geq g \quad \forall s \notin F, \forall a$$

$$\exists a: \langle \theta, \phi(s, a) \rangle = 0 \quad \forall s \in F$$

$$\underline{\theta} \leq \theta \leq \overline{\theta}$$

The problem can be solved using linear programming. In implementations using binary variables and linear constraints, the discrete optimization problem can be transformed into a mixed integer linear programming (MILP) problem.

The constrained optimization problem of finding penalty functions for relations with large gaps can be solved using Satisfiability Modulo Theory (SMT). SMT can generalize Boolean satisfiability by allowing some Boolean variables to represent equality/inequality predicates over continuous variables. An SMT problem can be solved using a conventional SMT solver.

The constrained optimization problem described above can be reformulated as an SMT problem by considering the feasibility problem first, in which the gap g is fixed, and then searching for the best gap g.

To identify the settings of ancillary variables that make the following equality hold $$\langle \theta, \phi(s,a) \rangle = 0$$

the reformulation introduces new binary variables β(x, i) corresponding to the setting of ancillary variable i for x∈F. Thus:

$$\langle \theta, \phi(x, \beta(x)) \rangle = 0$$

Since the above equation is quadratic in the set of decision variables x, the expression is grounded over all possible settings of ancillary variables to give the following SMT model for the problem:

FEAS(θ,β): find θ,β such that $$\langle \theta, \phi(x,\beta(x)) \rangle \geq 0 \, \forall s \in F, \forall a$$

$$\langle \theta, \phi(x,\beta(x)) \rangle \geq g \, \forall s \notin F, \forall a$$

$$2\beta(s) - 1 = a \Rightarrow \langle \theta, \phi(s,a) \rangle = 0 \, \forall s \in F, \forall a$$

$$\underline{\theta} \leq \theta \leq \overline{\theta}$$

A challenge is that the problem can become large. The number of inequality constraints, implication constraints and bound constraints (see above) can make the model become intractable.

One approach is to integrate variable elimination into the method. The approach exploits the low treewidth of $G_a$, the subgraph induced by the ancillary variables. The approach can solve an Ising model in $G_a$ using dynamic programming or, more specifically, variable elimination (VE). VE is a conventional technique that can be used to estimate marginal distribution over a subset of variables. VE can be efficient for low-treewidth graphs. The approach can be accomplished by encoding the minimization over the ancillary variables by mimicking VE in the SMT model. While it can introduce additional variables, the approach can reduce the number of constraints required.

VE proceeds in order, eliminating one ancillary variable at a time. Each ancillary variable can be associated with a set $F_i$ of factors. The sets $F_i$ are known as buckets and can be updated during the process. Factors in $F_i$ can consist of functions that depend on ancillary variable i and ancillary variables with index less than i, stored as tables.

The symbol $v_i$ is defined as the set of ancillary variables involved in the factors in $F_i$ other than the ancillary variable i itself. Assume the first variable to be eliminated in order is h. Once variables in $v_h$ are instantiated to $a_{v_h}$, the optimal setting of variable h can be found by solving the following:

$$m_h(a_{v_h} \mid h) := \min_{a_h} f_h(a_h \mid x) + \sum_{f \in F_h} f(a_h, a_{v_h})$$

where $m_h(a_{v_h}|x)$ is a message variable.

The $2^{|V_h|}$ values can be stored in a table that can be added to the bucket $F_i$ of variable i with largest index in $v_i$. Iteratively, variable i can be eliminated by solving the above relation, generating factor $T_i$ which can then be added to $F_k$ where k is the largest index in $v_i$.

When the method terminates, the value of the Ising model is:

$$\min_a \langle \theta, \phi(x, a) \rangle = c(x) + \sum_{i: v_i = \emptyset} m_i(a_{v_i} \mid x)$$

VE can be incorporated into the SMT model in the same way as before. When $\theta$ is not fixed, the message variables can be upper-bound by adding constraints. As before, if $x \notin F$, the constraint $\langle \theta, \phi(x,a) \rangle \geq g$ for all a can be replaced by:

$$c(x) + \sum_{i: v_i = \emptyset} m_i(\emptyset \mid x)$$

since the message variables can provide a lower bound on the QUBO $\min_a \langle \theta, \phi(x, a) \rangle$.

For $x \notin F$, the method must ensure that all the message variables are tight. In this way, the method can enforce $\min_a \langle \theta, \phi(x, a) \rangle = 0$ with the constraint $$c(x) + \sum_{i: v_i = \emptyset} m_i(\emptyset \mid x)$$

For some problems, constraints arising from variable elimination can be redundant. Message variables can be identified that have to be equal. Eliminating or at least reducing redundant constraints can reduce the size of the feasibility problem $FEAS(\theta, \beta)$ described above.

The model can be further consolidated by exploiting automorphisms of the graph G, and gauge symmetries of the Ising energy $\langle \theta, \phi(z) \rangle$.

The order in which constraints are presented to the SMT solver can affect the time it takes to find a solution. One approach to reducing the time taken to find a solution is to run more than one instance of the SMT solver at essentially the same time, each SMT solver with a random shuffling of the order in which constraints are presented to it.

It is desirable to make it easier to solve the SMT model described above. One approach can be to include valid, redundant constraints.

Another approach can be to exploit the properties of the input such as relation F, graph G, and subgraph $G_a$. An example can include exploiting the symmetries of the graph G and imposing constraints that break the symmetry without changing the satisfiability of the problem.

Yet another approach can be to impose additional constraints that reduce the size of the problem by reducing the search space without changing the satisfiability of the problem. An example can include using the symmetry of a problem to re-parameterize the problem using fewer variables.

Figure 11A:
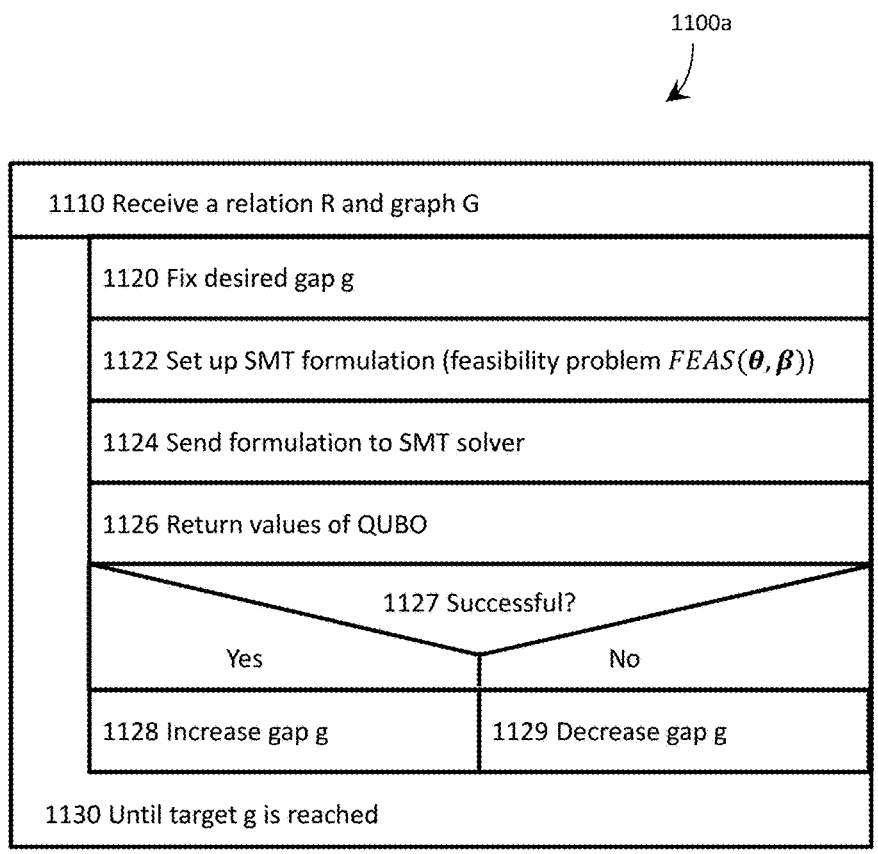
FIG. 11A is a Nassi-Shneiderman diagram illustrating a method for finding a QUBO using SMT.

FIG. 11A is a Nassi-Shneiderman diagram illustrating a method for finding a QUBO using SMT. The Nassi-Shneiderman diagram is a top-down decomposition of the method into one or more blocks according to a structured programming approach. The Nassi-Shneiderman diagram comprises one or more process blocks such as block 1110 of FIG. 1100A, one or more branching blocks such as block 1127 of FIG. 1100A, and one or more testing loops such as loop 1130 of FIG. 1100A.

At process block 1110 of method 1100a, the system receives a set of relations R and a graph G.

At block 1120, the system assigns a value to a desired gap. At 1122, the system sets up an SMT formulation of the QUBO finding problem, and, at 1124, sends the SMT formulation to an SMT solver.

At block 1126, the system receives values of a found QUBO returned by the SMT solver.

At branching block 1127, the system determines whether the QUBO finding has been successful. If so, then the system proceeds to block 1128 and increases the desired gap. If not, then the system proceeds to block 1129 and decreases the desired gap.

Blocks 1120, 1122, 1124, 1126, 1127, 1128 and 1129 are repeated in sequence until a condition is reached at 1130. At 1130, the system tests to see if a target g has been achieved. If the target g has been achieved, then the system completes method 1100a. If the target g has not been achieved, then the system returns method 1100a to 1120.

Figure 11B:
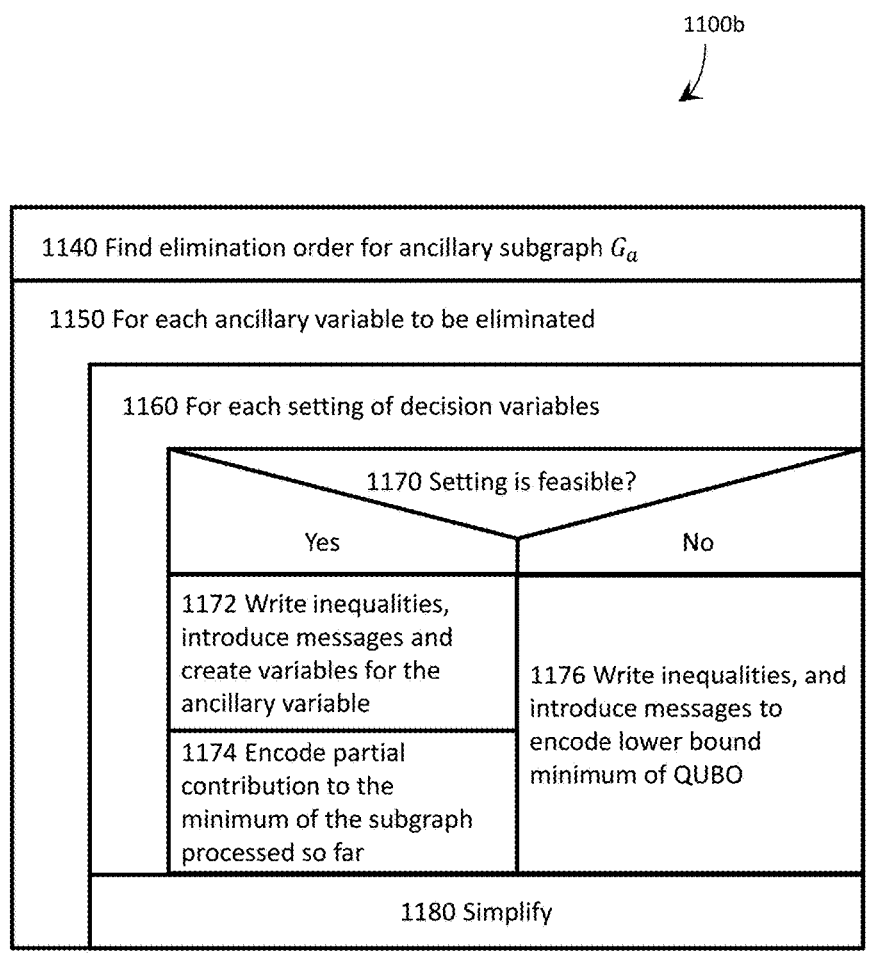
FIG. 11B is a Nassi-Shneiderman diagram illustrating a method for finding a QUBO using SMT and variable elimination.

FIG. 11B is a Nassi-Shneiderman diagram illustrating a method 1100b for finding a QUBO using SMT and variable elimination.

At 1140 of method 1100b, the system determines the elimination order for the ancillary subgraph.

At 1150, method 1100b begins a testing loop for each ancillary variable to be eliminated. Blocks 1160, 1170, 1172, 1174, 1176 and 1180 are inside testing loop 1150, and are repeated for each ancillary variable to be eliminated. Not all of blocks 1172, 1174, and 1176 are performed in each iteration, depending on the branching block at 1170.

At 1160, method 1100b begins a testing loop for each setting of the decision variables. Blocks 1170, 1172, 1174, and 1176 are inside testing loop 1160, and are repeated for each setting of the decision variables. Not all of blocks 1172, 1174, and 1176 are performed in each iteration, depending on the branching block at 1170.

At branching block 1170, the system determines if the setting of decision variables is feasible. If so, then, at 1172, the system writes inequalities, introduces messages and creates variables for the ancillary variable, and, at 1174, the system encodes partial contributions to the minimum of the subgraph processed so far. If, at 1170, the system determines the setting of decision variables is infeasible, then, at 1176, the system writes inequalities, and introduces messages to encode a lower bound minimum of the QUBO.

At 1180, the system determines a simplification.

Probabilistically Derived Penalties

Another approach to deriving penalties is to consider the set of feasible configurations F as a training set, and to find a probabilistic model under which the training set F has high likelihood. It is also desirable that the set of infeasible configurations has low likelihood.

A probabilistic approach turns the objective function into an energy function for which the method maximizes the likelihood of having low energy states for the feasible set of relations.

The method can be based on an exponential probability distribution comprising ancillary variables, as follows:

$$P(x, a | \theta) = \frac{1}{Z_{\bar{\beta}}(\theta)} \exp(-\bar{\beta}\langle \theta, \phi(x, a)\rangle)$$

$$P(x | \theta) = \sum_n P(x, a | \theta) \equiv \exp(-\bar{\beta} e(x | \theta))$$

where x are decision variables, a are ancillary variables, θ are hardware parameters and β is the inverse temperature.

The method defines a marginal distribution for the decision variables e(x|θ) known as the effective energy. The effective energy is obtained by marginalizing over the ancillary variables, and gives the probability of the decision variables without reference to the values of the ancillary variables.

Another way to define the effective energy e(x|θ) is by performing a soft minimization over ancillary variables a.

Typically, a standard maximum likelihood approach would result in $$\theta^* = \mathrm{argmax}_\theta \Sigma_{x \in F} \ln P(x|\theta)$$

The probability distribution P(a|x,θ) can be used to query the most likely setting of ancillary variables for each x∈F.

An improved method is described in the following paragraphs.

The improved method first defines a loss function $l_\beta(\varepsilon)$ which penalizes positive values of an error ε. An example of the function $l_\beta(\varepsilon)$ in one implementation is:

$$l_\beta(\varepsilon) = \ln(\exp(\beta\varepsilon)+1)/\beta$$

which is zero for ε<<0, and ε for ε>>0. The inverse temperature β controls the width of the transition from a value of zero to a value of ε.

The purpose of the loss function $l_\beta(\varepsilon)$ is to separate feasible configurations from infeasible configurations. It is desirable that the loss function $l_\beta(\varepsilon)$ penalizes positive values of the error ε. In another implementation, the loss function $l_\beta(\varepsilon)$ can be different than the one defined above. For example, the loss function $l_\beta(\varepsilon)$ can be a sigmoid function such as $l_\beta(\varepsilon)=1/(1+\exp(-\varepsilon))$.

The improved method then minimizes an objective function. In one implementation, the objective function can be $C_\beta(\theta,\mu)$ defined as:

$$C_\beta(\theta, \mu) = \sum_{x \in F} \ell_\beta(e(x|\theta) - \mu) + \sum_{x \notin F} \ell_\beta(\mu - e(x|\theta))$$

$C_\beta(\theta,\mu)$ can be minimized with respect to θ and μ. $C_\beta(\theta,\mu)$ can be minimized using a gradient descent method or other suitable minimization method.

In another implementation, a different objective function can be defined and minimized. Suitable objective functions can include functions with the property that larger gaps result in smaller loss values.

The variable μ is an optimization variable. In practice, it can represent a demarcation or boundary value between the set of feasible configurations and the set of infeasible configurations.

The method can anneal β starting from small values to reduce the chances of becoming trapped in local minima. For very small values of β, the loss function can be approximately a constant, in which case there is little or no distinction between the set of feasible configurations and the set of infeasible configurations.

In one approach, the method defines a logarithmic barrier function as follows which penalizes positive values of error ε:

$$\Phi(\varepsilon; t) = \begin{cases} -\frac{1}{t}\ln(-\varepsilon) & \text{if } \varepsilon < 0 \\ \infty & \text{otherwise} \end{cases}$$

The effective energy can be written as follows, which approximates the minimum over ancillary variables a as β→∞ (that is, as the method anneals β):

$$e_\beta(x|\theta) = -\frac{1}{\beta} \ln \sum_n \exp(-\beta\langle \theta, \phi(x, a)\rangle)$$

The following objective function can be minimized with respect to θ, μ and g for a given value of t:

$$C_\beta(\theta, \mu, g; t) = -g + \sum_{x \in F} \Phi(e_\beta(x|\theta) - \mu; t) + \sum_{x \notin F} \Phi(\mu + g - e_\beta(x|\theta); t)$$

The method starts with a small value of t, the result of interest being the limit as t→∞. The method iterates on t for each value of β.

An initial feasible point can be obtained by setting $\mu = \max_{x \in F} e_\beta(x|\theta)+\varepsilon$ and $g = \min_{x \notin F} e_\beta(x|\theta)-\mu-\varepsilon$ where ε>0 and is very small.

In practice, the penalty gap g separating x∈F and x∉F can start out as a negative value and can become positive as a consequence of the method described above. When the penalty gap is negative, there is at least one member of the set of infeasible configurations with a lower energy state than at least one member of the set of feasible configurations.

Figure 12:
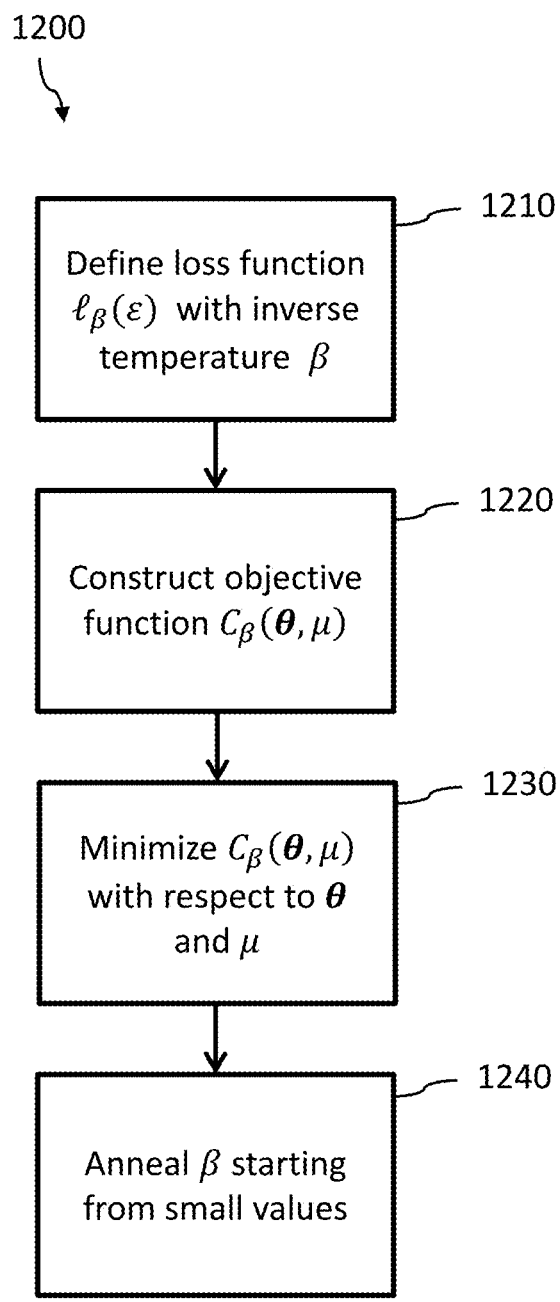
FIG. 12 is a flow-diagram illustrating a method for deriving penalty functions using a probabilistic approach.

FIG. 12 shows a method 1200 for deriving penalty functions using a probabilistic approach. The method can be implemented by a system comprising a digital computer and a quantum computer, such as the system illustrated in FIG. 14.

At 1210 of method 1200, the system defines a loss function that penalizes positive values of a variable ε. As described above, the loss function comprises a parameter, known as the inverse temperature β, that controls the width of the transition from a value of zero to a value of ε.

At 1220, the system constructs an objective function at inverse temperature β and dependent on the programmable parameters θ and an optimization parameter μ.

At 1230, the system seeks to find a minimum of the objective function defined at 1220, the minimum being with respect to θ and μ.

At 1240, the system anneals the inverse temperature, starting at small values, to mitigate becoming trapped in local minima.

Figure 13:
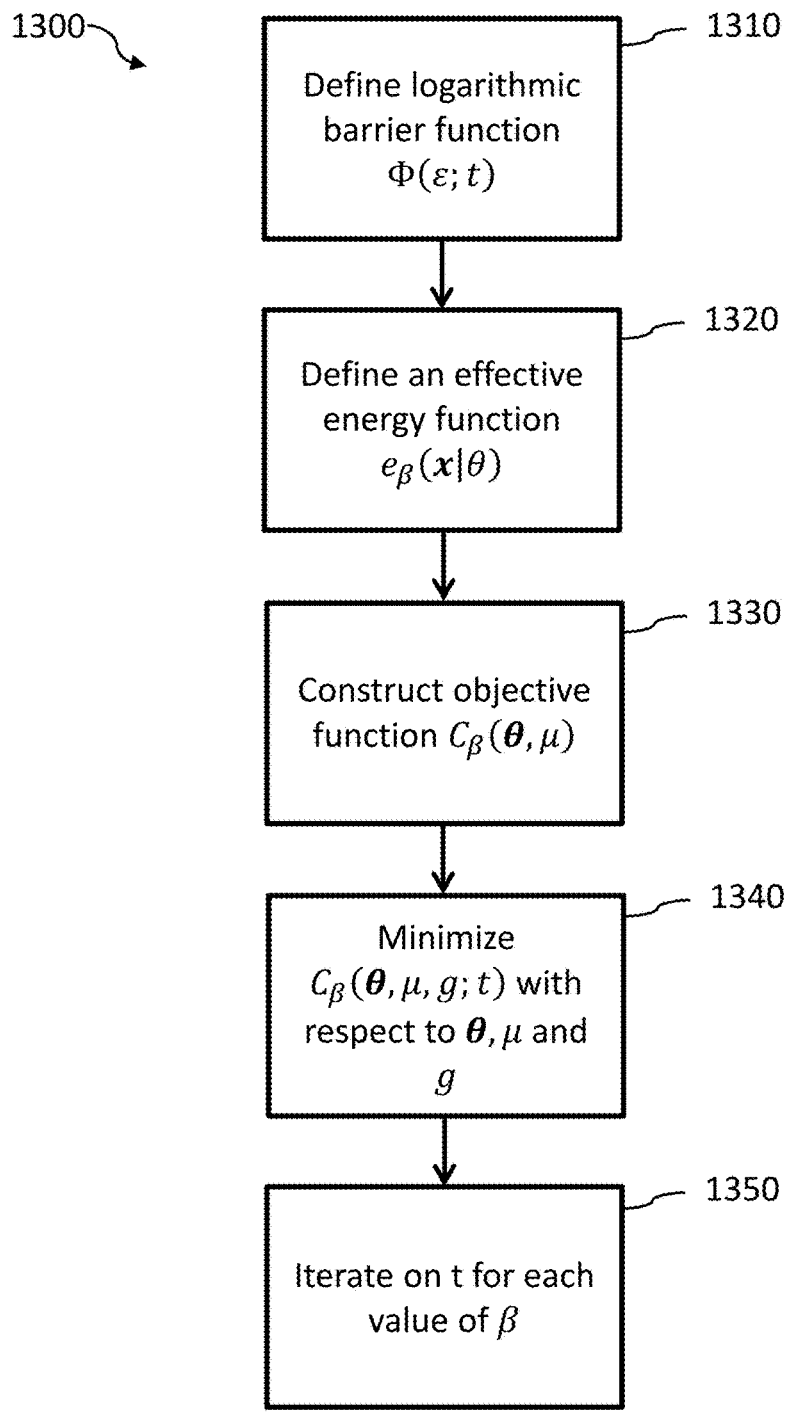
FIG. 13 is a flow-diagram illustrating another method for deriving penalty functions using a probabilistic approach.

FIG. 13 shows another method 1300 for deriving penalty functions using a probabilistic approach.

At 1310 of method 1300, the system defines a logarithmic barrier function that penalizes positive values of a variable ε.

At 1320, the system defines an effective energy as a function of decision variables x and the programmable parameters θ. The effective energy function approximates a minimum over the ancillary variables as the inverse temperature tends to infinity.

At 1330, the system constructs an objective function dependent on the programmable parameters θ, an optimization parameter μ, and a value of a penalty gap g.

At 1340, the system seeks to find a minimum of the objective function defined at 1330, the minimum being with respect to θ, μ and g.

At 1350, the system iterates on t for each value of β.

Exemplary Computing System

Figure 15:
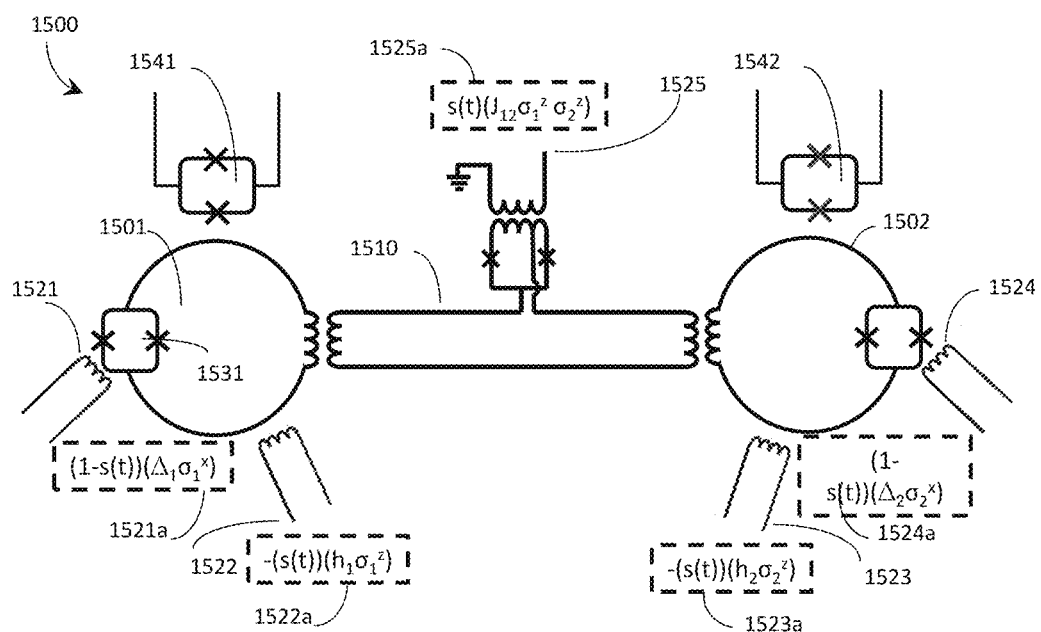
FIG. 15 is a schematic diagram of a portion of a superconducting quantum processor designed for quantum annealing and/or adiabatic quantum computation to implement tasks described in the present disclosure.

A QUBO problem can be found using a digital computer. A QUBO problem can be solved on a digital computer or a quantum computer. A digital computer coupled to a quantum computer is shown in FIG. 14. A portion of a quantum computer is shown in FIG. 15.

FIG. 14 illustrates computing system 1400 including a digital computer 1401 coupled to a quantum computer 1451. Shown is an exemplary digital computer 1401 including a digital processor that may be used to perform classical digital processing tasks described in the present systems and methods.

Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like.

Digital computer 1401 will at times be referred to in the singular herein, but this is not intended to limit the application to a single digital computer. The present systems and methods can also be practiced in distributed computing environments, where tasks or modules are performed by remote processing devices, which are linked through a communications network. In a distributed computing environment, program modules may be located in both local and remote memory storage devices.

Digital computer 1401 may include at least one processing unit (such as, central processor unit 1410), at least one system memory 1420, and at least one system bus 1417 that couples various system components, including system memory 1420 to central processor unit 1410.

The digital processor may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 14 are of conventional design. As a result, such blocks need not be described in further detail herein, as they will be understood by those skilled in the relevant art.

System bus 1417 can employ any known bus structures or architectures, including a memory bus with a memory controller, a peripheral bus, and a local bus. System memory 1420 may include non-volatile memory such as read-only memory ("ROM") and volatile memory such as random access memory ("RAM") (not shown). A basic input/output system ("BIOS") 1421, which can form part of the ROM, contains basic routines that help transfer information between elements within digital computer 1401, such as during startup.

Digital computer 1401 may also include other non-volatile memory 1415. Non-volatile memory 1415 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette.

Non-volatile memory 1415 may communicate with digital processor via system bus 1417 and may include appropriate interfaces or controllers 1416 coupled to system bus 1416. Non-volatile memory 1415 may serve as long-term storage for computer-readable instructions, data structures, program modules and other data for digital computer 1401.

Although digital computer 1401 has been described as employing hard disks, optical disks and/or magnetic disks, those skilled in the relevant art will appreciate that other types of non-volatile computer-readable media may be employed, such a magnetic cassettes, flash memory cards, Bernoulli cartridges, Flash, ROMs, smart cards, etc.

Various program modules, application programs and/or data can be stored in system memory 1420. For example, system memory 1420 may store an operating system 1423, and server modules 1427. In some embodiments, server module 1427 includes instruction for communicating with remote clients and scheduling use of resources including resources on the digital computer 1401 and quantum computer 1451. For example, a Web server application and/or Web client or browser application for permitting digital computer 1401 to exchange data with sources via the Internet, corporate Intranets, or other networks, as well as with other server applications executing on server computers.

In some implementations, system memory 1420 may store a calculation module 1431 to perform pre-processing, co-processing, and post-processing to quantum computer 1451. In accordance with the present systems and methods, system memory 1420 may store at set of quantum computer interface modules 1435 operable to interact with a quantum computer 1451. While shown in FIG. 14 as being stored in system memory 1420, the modules shown and other data can also be stored elsewhere including in nonvolatile memory 1415.

The quantum computer 1451 can be provided in an isolated environment (not shown) to shield the internal elements of the quantum computer from heat, magnetic field, and the like. The quantum computer can include a quantum processor 1440 including qubits having programmable topology as discussed herein. Examples of qubits are discussed below. The qubits are readout via readout out system 1460. These results are fed to the various modules in the digital computer 1401 including server modules 1427, calculation module 1431, or quantum computer interface modules 1435, stored in nonvolatile memory 1415, returned over a network or the like.

The qubits are controlled via qubit control system 1465. The couplers are controlled via coupler control system 1470. In some embodiments of the qubit control system 1465 and the coupler control system 1470 are used to implement quantum annealing as described herein on quantum processor 1440.

In some implementations, the digital computer 1401 can operate in a networking environment using logical connections to at least one client computer system. In some implementations, the digital computer 1401 can be coupled via logical connections to at least one database system. These logical connections may be formed using any means of digital communication, for example, through a network, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks.

The information sent or received via the logical connections may or may not be encrypted. When used in a LAN networking environment, digital computer 1401 may be connected to the LAN through an adapter or network interface card ("NIC") (communicatively linked to bus 1417). When used in a WAN networking environment, digital computer 1401 may include an interface and modem (not shown), or a device such as NIC, for establishing communications over the WAN. Non-networked communications may additionally, or alternatively be employed.

In accordance with some embodiments of the present systems and devices, a quantum processor may be designed to perform adiabatic quantum computation and/or quantum annealing. An evolution Hamiltonian is proportional to the sum of a first term proportional to the problem Hamiltonian and a second term proportional to the disordering Hamiltonian. As previously discussed, a typical evolution may be represented by:

$$H_E \propto A(t)H_D + B(t)H_P$$

where $H_P$ is the problem Hamiltonian, $H_D$ is the disordering Hamiltonian, $H_E$ is the evolution or instantaneous Hamiltonian, and A(t) and B(t) are examples of an evolution coefficient which controls the rate of evolution.

In general, evolution coefficients vary from 0 to 1. In some embodiments, a time varying evolution coefficient is placed on the problem Hamiltonian. A common disordering Hamiltonian is as follows:

$$H_D \propto -\frac{1}{2}\sum_{i=1}^{N}\Delta_i \sigma_i^x$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms.

A common problem Hamiltonian includes first component proportional to diagonal single qubit terms and a second component proportional to diagonal multi-qubit terms. The problem Hamiltonian, for example, may be of the form:

$$H_P \propto -\frac{\varepsilon}{2}\left[\sum_{i=1}^{N} h_i \sigma_i^z + \sum_{j>i}^{N} J_{ij}\sigma_i^z \sigma_j^z\right]$$

where N represents the number of qubits, $\sigma_i^z$ is the Pauli z-matrix for the $i^{th}$ qubit, $h_i$ and $J_{ij}$ are dimensionless local fields coupled into each qubit, and $\varepsilon$ is some characteristic energy scale for $H_p$. Here, the $\sigma_i^z$ and $\sigma_i^z \sigma_j^z$ terms are examples of "diagonal" terms. The former is a single qubit term and the latter a two qubit term. Throughout this specification, the terms "problem Hamiltonian" and "final Hamiltonian" are used interchangeably.

Hamiltonians such as $H_D$ and $H_P$ defined in the equations above may be physically realized in a variety of different ways. A particular example is realized by an implementation of superconducting qubits.

Exemplary Superconducting Quantum Processor

FIG. 15 is a schematic diagram of a portion of an exemplary superconducting quantum processor 1500 designed for quantum annealing (and/or adiabatic quantum computing) components from which may be used to implement the present systems and devices.

The portion of superconducting quantum processor 1500 shown in FIG. 15 includes two superconducting qubits 1501, and 1502. Also shown is a tunable ZZ-coupling (diagonal coupling) 1510 between qubits 1501 and 1502, the tunable ZZ-coupling 1510 providing 2-local interaction. While the portion of quantum processor 1500 shown in FIG. 15 includes only two qubits 1501, 1502 and one coupler 1510, those of skill in the art will appreciate that quantum processor 1500 may include any number of qubits and any number of coupling devices coupling information between them.

The portion of quantum processor 1500 shown in FIG. 15 may be implemented to physically realize adiabatic quantum computing and/or quantum annealing.

Quantum processor 1500 includes a plurality of interfaces 1521-1525 that are used to configure and control the state of quantum processor 1500. Each of interfaces 1521-1525 may be realized by a respective inductive coupling structure, as illustrated, as part of a programming subsystem and/or an evolution subsystem. Such a programming subsystem and/or evolution subsystem may be separate from quantum processor 1500, or it may be included locally (for example on-chip with quantum processor 1500) as described in, for example, U.S. Pat. No. 7,876,248 and U.S. Pat. No. 8,035,540.

In the operation of quantum processor 1500, interfaces 1521 and 1524 may each be used to couple a flux signal into a respective compound Josephson junction 1531 and 1532 of qubits 1501 and 1502, thereby realizing the $\Delta_i$ terms in the system Hamiltonian. This coupling provides the off-diagonal terms of the Hamiltonian described above and these flux signals are examples of "disordering signals." Similarly, interfaces 1522 and 1523 may each be used to apply a flux signal into a respective qubit loop of qubits 1501 and 1502, thereby realizing the $h_i$ terms in the system Hamiltonian. This coupling provides the diagonal $\sigma_i^z$ terms described in the equations above. Furthermore, interface 1525 may be used to couple a flux signal into coupler 1510, thereby realizing the $J_{ij}$ term(s) in the system Hamiltonian. This coupling provides the diagonal $\sigma_i^z \sigma_j^z$ terms described in the equations above.

In FIG. 15, the contribution of each of interfaces 1521-1525 to the system Hamiltonian is indicated in boxes 1521a-1525a, respectively. As shown, in the example of FIG. 15, the boxes 1521a-1525a are elements of time varying Hamiltonian for adiabatic quantum computing and/or quantum annealing.

Throughout this specification and the appended claims, the term "quantum processor" is used to generally describe a collection of physical qubits (such as qubits 1501 and 1502) and couplers (such as coupler 1510). The physical qubits 1501 and 1502 and the couplers 1510 are referred to as the "programmable elements" of the quantum processor

1500 and their corresponding parameters (such as the qubit $h_i$ values and the coupler $J_{ij}$ values) are referred to as the "programmable parameters" of the quantum processor.

In the context of a quantum processor, the term "programming subsystem" is used to generally describe the interfaces (e.g., "programming interfaces" 1522, 1523, and 1525) used to apply the programmable parameters (e.g., the $h_i$ and $J_{ij}$ terms) to the programmable elements of the quantum processor 1500 and other associated control circuitry and/or instructions. As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions. Similarly, in the context of a quantum processor, the term "evolution subsystem" is used to generally describe the interfaces (e.g., "evolution interfaces" 1521 and 1524) used to evolve the programmable elements of the quantum processor 1500 and other associated control circuitry and/or instructions. For example, the evolution subsystem may include annealing signal lines and their corresponding interfaces (1521, 1524) to the qubits (1501, 1502).

Quantum processor 1500 also includes readout devices 1551 and 1552, where readout device 1551 is associated with qubit 1501 and readout device 1542 is associated with qubit 1502. In the embodiment shown in FIG. 15, each of readout devices 1551 and 1552 includes a DC-SQUID inductively coupled to the corresponding qubit. In the context of quantum processor 1500, the term "readout subsystem" is used to generally describe the readout devices 1551, 1552 used to read out the final states of the qubits (e.g., qubits 1501 and 1502) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication No. WO2012/064974.

While FIG. 15 illustrates only two physical qubits 1501, 1502, one coupler 1510, and two readout devices 1551, 1552, a quantum processor (e.g., processor 1500) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Examples of superconducting qubits include superconducting flux qubits, superconducting charge qubits, and the like. In a flux qubit, the Josephson energy dominates or is equal to the charging energy. In a charge qubit, it is the reverse. Examples of flux qubits that may be used include rf-SQUIDs, which include a superconducting loop interrupted by one Josephson junction, persistent current qubits, which include a superconducting loop interrupted by three Josephson junctions, and the like. See examples of rf-SQUID qubits in Bocko, et al., 1997 *IEEE Trans. on Appl. Supercond.* 7, 3638; Friedman, et al., 2000, *Nature* 406, 43; and Harris, et al., 2010, *Phys. Rev. B* 81, 134510; or persistent current qubits, Mooij et al., 1999, *Science* 285, 1036; and Orlando et al., 1999, *Phys. Rev. B* 60, 15398. In addition, hybrid charge-phase qubits, where the energies are equal, may also be used. Further details of superconducting qubits may be found in Makhlin, et al., 2001, *Rev. Mod. Phys.* 73, 357; Devoret et al., 2004, arXiv:cond-mat/0411174; Zagoskin and Blais, 2007, *Physics in Canada* 63, 215; Clarke and Wilhelm, 2008, *Nature* 453, 1031; Martinis, 2009, *Quantum Inf. Process.* 8, 81; and Devoret and Schoelkopf, 2013, *Science* 339, 1169. In some embodiments, the qubit is controlled by on chip circuitry. Examples of on-chip control circuitry can be found in U.S. Pat. Nos. 7,876,248; 7,843,209; 8,018,244; 8,098,179; 8,169,231; and U.S. Patent Publication 2012-0094838.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. To the extent that they are not inconsistent with the specific teachings and definitions herein, all of the U.S. patents, U.S. patent application publications, U.S. patent applications, referred to in this specification and/or listed in the Application Data Sheet are incorporated herein by reference, including but not limited to U.S. Provisional Patent Application No. 61/906,220, filed Nov. 19, 2013, U.S. Provisional Patent Application No. 61/977,458, filed Apr. 9, 2014, and U.S. patent application Ser. No. 14/540,944, filed Nov. 13, 2014 each of which are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a problem solving system which includes at least a first processor and at least one non-transitory processor-readable medium communicatively coupled to the first processor and which stores at least one of processor-executable instructions or data, wherein one of a number of hardware limitations of a second processor imposes a number of bounds on a set of programmable parameters, the method comprising:

receiving, by the first processor, a problem to be solved;

representing, by the first processor, the problem to be solved as an Ising model, the Ising model having a number of constraints associated with the Ising model; and for each of the constraints associated the Ising model, determining, by the first processor, a respective Ising model penalty function subject to the bounds on the programmable parameters imposed by the hardware limitations of the second processor, where the respective Ising model penalty function for each constraint has a penalty gap associated with the respective Ising model penalty function that exceeds a predetermined threshold greater than zero wherein:
receiving a problem to be solved includes receiving a relation and a graph;
determining a respective Ising model penalty function subject to the bounds on the programmable parameters imposed by the hardware limitations of the second processor, includes iteratively determining the respective Ising model penalty function subject to the bounds on the programmable parameters imposed by the hardware limitations of the second processor to maximize the respective penalty gap of the respective Ising model penalty function; and
iteratively determining the respective Ising model penalty function subject to the bounds on the programmable parameters imposed by the hardware limitations of the second processor to maximize the respective penalty gap of the respective Ising model penalty function includes:
initializing a probe set, by the first processor, the probe set representing a subset of the relation, and associated with a linear programming problem that constitutes a relaxation of a linear programming problem associated with the problem to be solved;
initializing a lower bound, by the first processor;
for a number of cycles until an end condition is reached:
iterating over an expansion of the probe set and a configuration of ancillary variables to solve a first linear program to find a number of coefficients of the Ising model penalty function and the penalty gap which corresponds to the Ising model penalty function, by the first processor;
selecting an expanded probe set with less than a defined total number of solutions for which the penalty gap exceeds the lower bound, by the first processor;
determining whether for an expanded probe set there are no solutions for which the penalty gap exceeds the lower bound, by the first processor;
in response to determining that there are no solutions for which the penalty gap exceeds the lower bound, backtracking in the probe set, by the first processor;
selecting a respective configuration of ancillary variables;
solving a second linear program to determine a first new lower bound for the problem, by the first processor, the second linear program associated with all members of the relation and the selected configuration of ancillary variables;
in response to the first new lower bound exceeding the lower bound, setting the lower bound equal to the first new lower bound, by the first processor;
performing a local search over all members of the relation and the configuration of ancillary variables to determine a second new lower bound, by the first processor; and
in response to the second new lower bound exceeding the lower bound, setting the lower bound equal to the second new lower bound, by the first processor.

2. The method of claim 1 wherein selecting a respective configuration of ancillary variables includes selecting the respective configuration of ancillary variables at random based on a probability proportional to a difference between the penalty gap and the lower bound, by the first processor.

3. The method of claim 1 wherein performing a local search includes performing a tabu search.

4. The method of claim 1, wherein iteratively determining the respective Ising model penalty function subject to the bounds on the programmable parameters imposed by the hardware limitations of the second processor to maximize the respective penalty gap of the respective Ising model penalty function includes:
repeating the iterating, selecting, determining, backtracking, selecting, solving, setting and performing until the end condition of an earliest of: the lower bound exceeds a determined threshold, a defined time has elapsed, or a defined number of cycles has been performed.

5. The method of claim 1 wherein solving a first or a second linear program includes:
solving a first instance of the linear program based on an initial subset of one or more penalty function constraints;
identifying a new penalty function constraint, not in the initial subset of penalty function constraints, that is violated by an initial solution to the first instance of the linear program;
adding the identified new penalty function constraint to the subset of penalty function constraints to produce a revised subset of penalty function constraints; and
solving a second instance of the linear program based on the revised subset of penalty function constraints.

6. The method of claim 5, further comprising:
identifying another new penalty function constraint, not in the revised subset of penalty function constraints, that is violated by a subsequent solution to the second instance of the linear program;
adding the identified another new penalty function constraint to the subset of penalty function constraints to produce a further revised subset of penalty function constraints; and
solving a third instance of the linear program based on the further revised subset of penalty function constraints.

7. The method of claim 5, further comprising:
until no subsequent new penalty function constraints is found that is violated by a solution of a most recent instance of the linear program, repeatedly:
identifying a new penalty function constraint, not in a most recently revised subset of penalty function constraints, that is violated by a solution to a most recent instance of the linear program;
adding the identified new penalty function constraint to the most recently revised subset of penalty function constraints to produce subsequent revised subset of penalty function constraints; and
solving subsequent instances of the linear program based on respective ones of the subsequent revised subsets of penalty function constraints.

8. The method of claim 1 wherein determining a respective Ising model penalty function subject to the bounds on the programmable parameters imposed by the hardware limitations of the second processor, includes:
employing an initial subset of one or more penalty function constraints;
identifying a new penalty function constraint, not in the initial subset of penalty function constraints, that is violated by an initial solution to the first instance of the problem;
adding the identified new penalty function constraint to the subset of penalty function constraints to produce a revised subset of penalty function constraints; and employing the revised subset of penalty function constraints.

9. The method of claim 1 further comprising:
generating one or more ancillary variables for each of the respective Ising model penalty functions:
re-formulating, by the at least one processor, the received problem as a feasibility problem; and
finding, by the at least one processor, a largest energy gap for which the feasibility problem is satisfiable.

10. The method of claim 9 wherein finding a largest energy gap for which the feasibility problem is satisfiable includes:
re-formulating the feasibility problem by generating one or more inequalities, one or more continuous message variables and one or more binary variables, or by generating one or more inequalities and one or more continuous message variables;
determining an order;
placing the inequalities in the determined order, the inequalities eliminating the one or more ancillary variables in sequence, the one or more continuous message variables comprising one or more intermediate results, and the last in the sequence of the one or more continuous message variables comprising an empty set of ancillary variables.

11. A method of operation in a problem solving system which includes at least a first processor and at least one non-transitory processor-readable medium communicatively coupled to the first processor and which stores at least one of processor-executable instructions or data, wherein one of a number of hardware limitations of a second processor imposes a number of bounds on a set of programmable parameters, the method comprising:
receiving, by the first processor, a problem to be solved;
representing, by the first processor, the problem to be solved as an Ising model, the Ising model having a number of constraints associated with the Ising model; and
for each of the constraints associated the Ising model, determining, by the first processor, a respective Ising model penalty function subject to the bounds on the programmable parameters imposed by the hardware limitations of the second processor, where the respective Ising model penalty function for each constraint has a penalty gap associated with the respective Ising model penalty function that exceeds a predetermined threshold greater than zero wherein:
receiving a problem to be solved includes receiving a relation and a graph;
determining a respective Ising model penalty function subject to the bounds on the programmable parameters imposed by the hardware limitations of the second processor, includes iteratively determining the respective Ising model penalty function subject to the bounds on the programmable parameters imposed by the hardware limitations of the second processor to maximize the respective penalty gap of the respective Ising model penalty function; and
iteratively determining the respective Ising model penalty function subject to the bounds on the programmable parameters imposed by the hardware limitations of the second processor to maximize the respective energy gap of the respective Ising model penalty function includes:
determining, by the at least one processor, one or more members of a feasible set for the constraint;
determining, by the at least one processor, one or more members of an infeasible set for the constraint;
determining, by the at least one processor, an effective energy for one or more decision variables wherein the effective energy is a marginal probability distribution for the decision variables determined by marginalizing over one or more ancillary variables;
determining, by the at least one processor, an objective function having a value, the value which evaluated at the one or more programmable parameters is inversely related to a gap between the one or more members of the feasible set and the one or more members of the infeasible set, wherein the gap is related to a difference between the effective energy of at least one of the one or more members of the feasible set and the effective energy of at least one of the one or more members of the infeasible set; and
determining, by the at least one processor, a minimum value of the objective function with respect to the one or more programmable parameters.

12. The method of claim 11 wherein determining an objective function includes:
determining, by the at least one processor, a loss function which penalizes positive values of a variable, the loss function comprising an inverse temperature parameter, the inverse temperature parameter representative of a rate of change of the loss function over a range of interest of the variable; and
determining an objective function that comprises a summation of terms comprising the loss function evaluated for values representing a difference between the effective energy and a boundary parameter for each of the one or more members of the feasible set and the one or more members of the infeasible set, the boundary parameter related to a boundary between the one or more members of the feasible set and the one or more members of the infeasible set.

13. The method of claim 12 wherein the loss function is a sigmoid function.

14. The method of claim 12 further comprising:
initializing, by the at least one processor, the inverse temperature parameter; and
iterating over the inverse temperature parameter, by the at least one processor, until the gap exceeds a predetermined threshold.

15. The method of claim 11 wherein the one or more members of the feasible set for the constraint constitute all members of the feasible set for the constraint.

16. The method of claim 11 wherein iterating over the inverse temperature parameter, by the at least one processor, until the gap exceeds a predetermined threshold includes in each iteration:
incrementing the inverse temperature parameter; and
using the one or more programmable parameters from the previous iteration as a starting point for the current iteration.

17. The method of claim 11 wherein determining a respective Ising model penalty function subject to the bounds on the programmable parameters imposed by the hardware limitations of the second processor, includes:
employing an initial subset of one or more penalty function constraints;
identifying a new penalty function constraint, not in the initial subset of penalty function constraints, that is violated by an initial solution to the first instance of the problem;

adding the identified new penalty function constraint to the subset of penalty function constraints to produce a revised subset of penalty function constraints; and employing the revised subset of penalty function constraints.

18. The method of claim 11 further comprising:

generating one or more ancillary variables for each of the respective Ising model penalty functions:

re-formulating, by the at least one processor, the received problem as a feasibility problem; and finding, by the at least one processor, a largest energy gap for which the feasibility problem is satisfiable.

19. The method of claim 18 wherein finding a largest energy gap for which the feasibility problem is satisfiable includes:

re-formulating the feasibility problem by generating one or more inequalities, one or more continuous message variables and one or more binary variables, or by generating one or more inequalities and one or more continuous message variables;

determining an order;

placing the inequalities in the determined order, the inequalities eliminating the one or more ancillary variables in sequence, the one or more continuous message variables comprising one or more intermediate results, and the last in the sequence of the one or more continuous message variables comprising an empty set of ancillary variables.

* * * * *